US011763758B2

(12) United States Patent
Miyatani

(10) Patent No.: US 11,763,758 B2
(45) Date of Patent: Sep. 19, 2023

(54) LUMINANCE UNEVENNESS CORRECTION SYSTEM AND LUMINANCE UNEVENNESS CORRECTION METHOD

(71) Applicant: SHARP KABUSHIKI KAISHA, Sakai (JP)

(72) Inventor: Akiyoshi Miyatani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/747,918

(22) Filed: May 18, 2022

(65) Prior Publication Data

US 2022/0383827 A1    Dec. 1, 2022

Related U.S. Application Data

(60) Provisional application No. 63/193,912, filed on May 27, 2021.

(51) Int. Cl.
*G09G 3/34* (2006.01)
*G09G 3/36* (2006.01)
(Continued)

(52) U.S. Cl.
CPC ......... *G09G 3/3406* (2013.01); *G06T 7/0002* (2013.01); *G06V 10/22* (2022.01); *G06V 10/60* (2022.01); *G09G 3/006* (2013.01); *G09G 3/36* (2013.01); *G09G 2320/0233* (2013.01); *G09G 2360/145* (2013.01)

(58) Field of Classification Search
CPC ........ G09G 3/3406; G09G 3/006; G09G 3/36; G09G 2320/0233; G09G 2360/145; G09G 3/34; G06T 7/0002; G06V 10/22; G06V 10/60; G06V 10/141
See application file for complete search history.

(56) References Cited

U.S. PATENT DOCUMENTS 5,793,344 A * 8/1998 Koyama ................ H04N 17/04
                                                    348/E17.005
6,549,183 B1   4/2003 Koyama
(Continued)

FOREIGN PATENT DOCUMENTS

JP    H07-261719 A    10/1995

*Primary Examiner* — Jose R Soto Lopez
(74) *Attorney, Agent, or Firm* — ScienBiziP, P.C.

(57) ABSTRACT

A luminance-unevenness correction system includes the following: an inspection backlight; an imaging device that generates imaged panel data by imaging a liquid-crystal display panel being illuminated with the inspection backlight; and a correction device that generates correction data and transmits the correction data to the liquid-crystal display panel. The correction data is used for correcting the luminance unevenness of the liquid-crystal display panel. The imaging device can generate backlight luminance-distribution data indicating the luminance distribution of the inspection backlight, by imaging the inspection backlight remaining on. The correction device extracts panel luminance-distribution data from the imaged panel data and the backlight luminance-distribution data, and generates the correction data in accordance with the panel luminance-distribution data extracted. The panel luminance-distribution data indicates luminance unevenness specific to the liquid-crystal display panel.

12 Claims, 16 Drawing Sheets

(51) Int. Cl.
  *G06T 7/00* (2017.01)
  *G06V 10/60* (2022.01)
  *G09G 3/00* (2006.01)
  *G06V 10/22* (2022.01)

(56) References Cited

U.S. PATENT DOCUMENTS

| | | | | |
|---|---|---|---|---|
| 9,978,319 B2* | 5/2018 | Furumoto | | G02F 1/1347 |
| 11,170,680 B2* | 11/2021 | Lv | | G09G 3/2092 |
| 11,200,858 B1* | 12/2021 | Liou | | G09G 3/3607 |
| 2003/0193489 A1 | 10/2003 | Koyama | | |
| 2006/0109231 A1 | 5/2006 | Koyama | | |
| 2007/0097045 A1* | 5/2007 | Lee | | G09G 3/3426 345/82 |
| 2010/0103089 A1* | 4/2010 | Yoshida | | G09G 3/3426 345/102 |
| 2011/0157242 A1* | 6/2011 | Wang | | G09G 3/3426 345/690 |
| 2011/0216189 A1* | 9/2011 | Nagamine | | G06T 7/90 382/162 |
| 2012/0075274 A1* | 3/2012 | Ueno | | G09G 3/3426 345/207 |
| 2012/0188294 A1* | 7/2012 | Kobayashi | | H05B 45/56 315/297 |
| 2013/0050504 A1* | 2/2013 | Safaee-Rad | | G09G 5/02 348/181 |
| 2014/0232625 A1* | 8/2014 | Murase | | G09G 3/2003 345/89 |
| 2015/0063675 A1* | 3/2015 | Yan | | G09G 3/006 382/141 |
| 2015/0279326 A1* | 10/2015 | Kurita | | G09G 3/3413 345/589 |
| 2016/0011121 A1* | 1/2016 | Tomioka | | G01N 21/8851 348/128 |
| 2016/0232857 A1* | 8/2016 | Tamaru | | H04N 21/4318 |
| 2017/0186350 A1* | 6/2017 | Kim | | G09G 3/006 |
| 2018/0330651 A1* | 11/2018 | Miyatani | | G09F 9/00 |
| 2019/0348001 A1* | 11/2019 | Shi | | G09G 3/32 |
| 2019/0353961 A1* | 11/2019 | Ji | | G09G 3/3426 |
| 2019/0355316 A1* | 11/2019 | Ji | | G09G 3/36 |
| 2020/0126498 A1* | 4/2020 | Li | | G09G 3/3607 |
| 2021/0134236 A1* | 5/2021 | Shiomi | | G09G 3/3611 |
| 2021/0233479 A1* | 7/2021 | Shiomi | | G09G 3/3426 |
| 2021/0241703 A1* | 8/2021 | Shiomi | | G02F 1/133 |
| 2021/0311361 A1* | 10/2021 | Okamoto | | G09G 5/10 |
| 2021/0390916 A1* | 12/2021 | Shi | | G09G 3/342 |
| 2022/0230602 A1* | 7/2022 | Chang | | G09G 5/10 |

* cited by examiner

IMAGING OF LIQUID-CRYSTAL DISPLAY PANEL

GENERATION OF IMAGED PANEL DATA

LUMINANCE UNEVENNESS CORRECTION SYSTEM AND LUMINANCE UNEVENNESS CORRECTION METHOD

CROSS-REFERENCE TO RELATED APPLICATION

The present application claims priority from Provisional Application No. 63/193,912, the content to which is hereby incorporated by reference into this application.

BACKGROUND

1. Field

The present disclosure relates to a luminance-unevenness correction system that corrects the luminance unevenness of a liquid-crystal display panel, and to a method of such luminance-unevenness correction.

2. Description of the Related Art

A liquid-crystal display panel has been recently used widely for display units of various electronic apparatuses. Luminance unevenness (display unevenness) that occurs in an image displayed on the liquid-crystal display panel considerably affects display quality and hence needs to be corrected properly.

Luminance unevenness is conventionally corrected by taking an image displayed on the liquid-crystal display panel with a camera, and generating correction data in accordance with the taken image. The correction data is written into a storage device of the liquid-crystal display panel, and the correction data read from the storage device is used to correct image data. Such a method of luminance-unevenness correction is disclosed in Patent Literature 1 (JP-H7-261719) for instance.

SUMMARY

Some liquid-crystal display panels are distributed in combination with a backlight (referred to as a "module"), and others are distributed without a backlight (referred to as an "open cell").

For correcting the luminance unevenness of an open-cell liquid-crystal display panel, the liquid-crystal display panel needs to be illuminated using an inspection backlight (jig backlight), because an open cell includes no backlight. The inspection backlight thus preferably has no luminance unevenness as much as possible, that is, luminance is preferably uniform as much as possible throughout its emission surface.

It is unfortunately difficult actually to prepare an inspection backlight without luminance unevenness. Luminance unevenness in an inspection backlight is caused by the luminance difference between light sources (such as cold-cathode tubes or LEDs) and a region located between the light sources, or by partial luminance reduction resulting from long-term use. In a direct-lit backlight, luminance uniformity can be improved by increasing the density of arrangement of the light sources, but this method increases facility costs. Luminance unevenness is also caused by replacement of some of the light sources due to light source exhaustion and other things. Replacing all the light sources of the backlight with new ones at the time of light source exhaustion and other things prevents luminance unevenness as a matter of course, but this method increases facility costs as well.

When the inspection backlight has luminance unevenness, luminance unevenness specific to the liquid-crystal display panel as well as luminance unevenness specific to the inspection backlight is reflected on an image taken by an imaging device. Correction data, generated from the taken image, hence has a value with which not only the luminance unevenness specific to the liquid-crystal display panel, but also the luminance unevenness specific to the inspection backlight is corrected. Referring to liquid-crystal display panels shipped as open cells, a final product is typically designed by a user in many cases, and hence it is difficult to obtain a backlight that is to be incorporated into the final product, or to know the specifications of the backlight. A backlight for the final product has luminance unevenness different from the luminance unevenness of the inspection backlight or has little luminance unevenness; hence, correcting luminance unevenness by the use of such correction data as described above (correction data for correcting both the luminance unevenness of the liquid-crystal display panel and the luminance unevenness of the inspection backlight) possibly leads to an excessive correction in the actual final product.

To solve the above problem, it is an object of preferred embodiments of the present invention to provide a luminance-unevenness correction system and a method of luminance-unevenness correction that can suitably correct the luminance unevenness of a liquid-crystal display panel that is distributed as an open cell.

The Specification discloses a luminance-unevenness correction system and a method of luminance-unevenness correction described in the following items.

Item 1

A luminance-unevenness correction system that corrects luminance unevenness of a liquid-crystal display panel, the luminance-unevenness correction system including:

an inspection backlight;

an imaging device configured to generate imaged panel data by imaging the liquid-crystal display panel being illuminated by the inspection backlight; and a correction device configured to generate correction data and then transmit the correction data to the liquid-crystal display panel, the correction data being used for correcting the luminance unevenness of the liquid-crystal display panel, wherein the imaging device is capable of generating backlight luminance-distribution data indicating a luminance distribution of the inspection backlight, by imaging the inspection backlight remaining on, and the correction device extracts panel luminance-distribution data from the imaged panel data and the backlight luminance-distribution data, and generates the correction data in accordance with the panel luminance-distribution data extracted, the panel luminance-distribution data indicating luminance unevenness specific to the liquid-crystal display panel.

Item 2

The luminance-unevenness correction system according to Item 1, wherein the correction device identifies a first region and a second region in the imaged panel data in accordance with the backlight luminance-distribution data, and the correction device does not generate the correction data for the first region and generates the correction data for the second region, the first region having luminance unevenness specific to the inspection backlight, the second region having no luminance unevenness specific to the inspection backlight.

Item 3

The luminance-unevenness correction system according to Item 1, wherein the correction device identifies a first region and a second region in the imaged panel data in accordance with the backlight luminance-distribution data, the first region having luminance unevenness specific to the inspection backlight, the second region having no luminance unevenness specific to the inspection backlight, a region of the panel luminance-distribution data having luminance unevenness specific to the liquid-crystal display panel includes an overlap portion overlapping the first region, and a non-overlap portion not overlapping the first region, and the correction device calculates a luminance difference at a boundary between the overlap portion and the non-overlap portion, and adds or subtracts a value corresponding to the luminance difference to or from a luminance value of the overlap portion, followed by generating the correction data.

Item 4

The luminance-unevenness correction system according to Item 1, wherein the correction device identifies a first region and a second region in the imaged panel data in accordance with the backlight luminance-distribution data, the first region having luminance unevenness specific to the inspection backlight, the second region having no luminance unevenness specific to the inspection backlight, a region of the panel luminance-distribution data having luminance unevenness specific to the liquid-crystal display panel includes an overlap portion overlapping the first region, and a non-overlap portion not overlapping the first region, and the correction device generates the correction data, followed by calculating a correction value difference at a boundary between the overlap portion and the non-overlap portion, and adding or subtracting a value corresponding to the correction value difference to or from a correction value of the overlap portion.

Item 5

The luminance-unevenness correction system according to any of Items 1 to 4, wherein the correction device extracts the panel luminance-distribution data by subtracting, from the imaged panel data, a luminance value of the backlight luminance-distribution data multiplied by a predetermined factor, or by subtracting the backlight luminance-distribution data from a luminance value of the imaged panel data multiplied by a predetermined factor.

Item 6

The luminance-unevenness correction system according to any one of Items 1 to 5, wherein the correction device is capable of detecting an amount of shift between origin point coordinates of the backlight luminance-distribution data and origin point coordinates of the imaged panel data.

Item 7

The luminance-unevenness correction system according to Item 6, wherein the correction device detects the amount of shift, by identifying a location that is regarded as a location identical between the backlight luminance-distribution data and the imaged panel data in accordance with a luminance value and a shape of a region having luminance unevenness in the backlight luminance-distribution data, and in accordance with a luminance value and a shape of a region having luminance unevenness in the imaged panel data.

Item 8

The luminance-unevenness correction system according to Item 6, further including a spot-light radiation device capable of radiating at least one spot light, wherein the correction device detects the amount of shift in accordance with the backlight luminance-distribution data generated with a particular part of an emission surface of the inspection backlight irradiated with the at least one spot light, and in accordance with the imaged panel data generated with a particular part of a display surface of the liquid-crystal display panel irradiated with the at least one spot light.

Item 9

The luminance-unevenness correction system according to Item 6, wherein the inspection backlight has a housing including a frame part located around an emission surface, and one or more emission units disposed in the frame part of the housing, and each being capable of emitting spot light, and the correction device detects the amount of shift in accordance with the backlight luminance-distribution data generated with the one or more emission units emitting spot light, and in accordance with the imaged panel data generated with the one or more emission units emitting spot light.

Item 10

A method of luminance-unevenness correction for correcting luminance unevenness of a liquid-crystal display panel, the method including:

step (A) of generating backlight luminance-distribution data indicating a luminance distribution of an inspection backlight, by imaging the inspection backlight remaining on;

step (B) of generating imaged panel data by imaging the liquid-crystal display panel being illuminated by the inspection backlight;

step (C) of extracting panel luminance-distribution data indicating luminance unevenness specific to the liquid-crystal display panel, from the imaged panel data and the backlight luminance-distribution data; and step (D) of generating correction data in accordance with the panel luminance-distribution data and then transmitting the correction data to the liquid-crystal display panel, the correction data being used for correcting the luminance unevenness of the liquid-crystal display panel.

Item 11

The method of luminance-unevenness correction according to Item 10, wherein a set of steps (A), (B), (C) and (D) is executed for each of liquid-crystal display panels that are targets of correction, and the method further comprises step (E) of, after step (A) for second and subsequent times is executed, comparing the backlight luminance-distribution data generated anew and the backlight luminance-distribution data generated last time or before.

Item 12

The method of luminance-unevenness correction according to Item 10 or 11, wherein a set of steps (A), (B), (C) and (D) is executed for each of liquid-crystal display panels that are targets of correction, and the method further comprises step (F) of, after step (B) for second and subsequent times is executed, comparing the imaged panel data generated anew and the imaged panel data generated last time or before.

Item 13

The method of luminance-unevenness correction according to any one of Items 10 to 12, further including step (G) of, after step (A) is executed, comparing a luminance value of an emission surface in the backlight luminance-distribution data generated and a luminance value established in advance for a production model.

The preferred embodiments of the present invention can provide a luminance-unevenness correction system and a method of luminance-unevenness correction that can suitably correct luminance unevenness in a liquid-crystal display panel that is distributed as an open cell.

DETAILED DESCRIPTION OF THE INVENTION

Preferred embodiments of the present invention will be described with reference to the drawings. The preferred embodiments of the present invention are not limited to the following illustrative configurations.

First Preferred Embodiment

Figure 1:
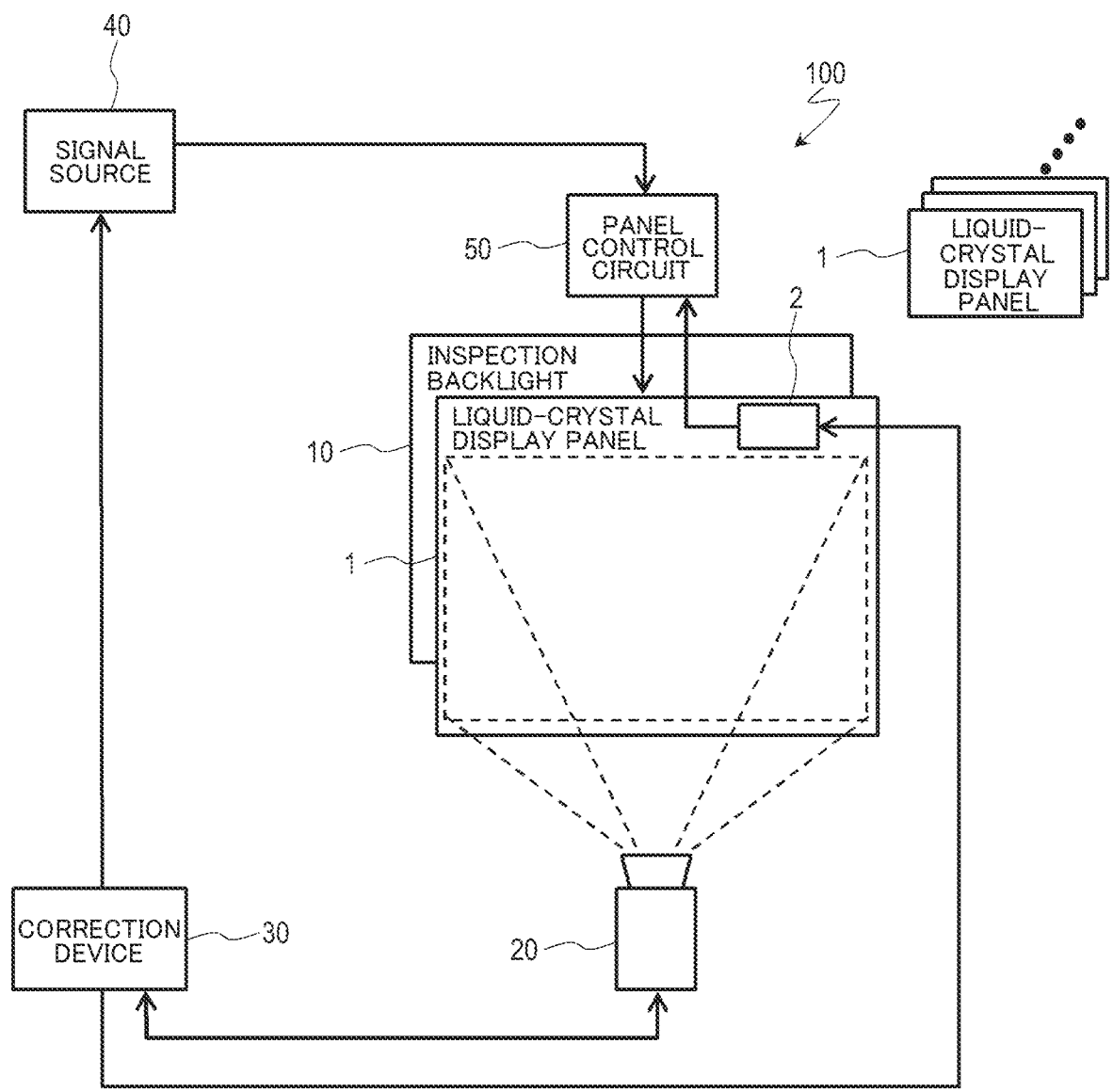
FIG. 1 is a schematic diagram of a luminance-unevenness correction system 100 according to a preferred embodiment of the present invention.

A luminance-unevenness correction system (hereinafter, referred merely to as a "correction system") 100 and a method of luminance-unevenness correction in this preferred embodiment will be described with reference to FIG. 1. FIG. 1 is a schematic diagram of the correction system 100.

The correction system 100 is a system that corrects the luminance unevenness of the liquid-crystal display panel 1. The correction system 100 can make corrections sequentially to a plurality of liquid-crystal display panels 1.

The correction system 100 includes an inspection backlight 10, an imaging device 20, and a correction device 30, as illustrated in FIG. 1. The correction system 100 in the illustrated example further includes a signal source 40 and a panel control circuit 50.

The liquid-crystal display panel 1, a target of correction, is an open-cell panel. The liquid-crystal display panel 1 is configured such that its image display is controlled by the panel control circuit 50 from outside. The liquid-crystal display panel 1 has a storage device 2. The storage device 2 is a non-volatile storage device, such as flash memory, for instance.

The inspection backlight 10 is an illumination device that illuminates the display region of the liquid-crystal display panel 1. The configuration of the inspection backlight 10 is non-limiting; the inspection backlight 10 may be a direct-lit type or an edge-lit type. The light source of the inspection backlight 10 is non-limiting; for instance, the light source may be a cold-cathode tube (fluorescent tube) or a light-emitting diode (LED).

The imaging device (camera) 20 generates imaged panel data by imaging the liquid-crystal display panel 1 being illuminated by the inspection backlight 10. The imaged panel data indicates the luminance distribution of the liquid-crystal display panel 1 being illuminated by the inspection backlight 10. The imaging device 20 has an imaging element and an optical system. Examples of the imaging element include a CCD image sensor and a CMOS image sensor. Examples of the optical system include, but not limited to, a zoom lens and a focus lens. The operation of the imaging device 20 is controlled by the correction device 30. The imaged panel data generated is output to the correction device 30.

The signal source 40 is a signal generation circuit that generates an image signal corresponding to an image displayed by the liquid-crystal display panel 1. The signal source 40 outputs the generated image signal to the panel control circuit 50. The operation of the signal source 40 is controlled by the correction device 30.

The correction device 30 controls the operation of the imaging device 20 and signal source 40. The correction device 30 also generates correction data, which is used for correcting the luminance unevenness of the liquid-crystal display panel 1, and then transmits the correction data to the liquid-crystal display panel 1. The correction data contains a correction value that is to be added to the gradation value of each pixel. The correction data transmitted to the liquid-crystal display panel 1 is written into the storage device 2 of the liquid-crystal display panel 1. The correction device 30 is a personal computer for instance.

The panel control circuit 50 is a dedicated circuit for controlling the image display of the liquid-crystal display panel 1 from outside. The panel control circuit 50 is connected between the signal source 40 and the liquid-crystal display panel 1 of a target of correction, and based on the image signal from the signal source 40, the panel control circuit 50 controls the image display of the liquid-crystal display panel 1.

In the correction system 100 in this preferred embodiment, the imaging device 20 can generate backlight luminance-distribution data, which indicates the luminance distribution of the inspection backlight 10, by imaging the inspection backlight 10 remaining on. The imaging device 20 is controlled to generate the backlight luminance-distribution data as well as the imaged panel data in this way.

The correction device 30 extracts panel luminance-distribution data, which indicates luminance unevenness specific to the liquid-crystal display panel 1, from the imaged panel data and backlight luminance-distribution data. To be specific, the panel luminance-distribution data is extracted by performing a predetermined data process including a subtraction process on the imaged panel data and backlight luminance-distribution data. The correction device 30 generates correction data in accordance with the extracted panel luminance-distribution data.

The correction device 30 in this preferred embodiment generates the correction data in accordance with the panel luminance-distribution data, indicating the luminance unevenness specific to the liquid-crystal display panel 1, as described above, thereby enabling correction making without the influence of the luminance unevenness specific to the inspection backlight 10.

Figure 2:
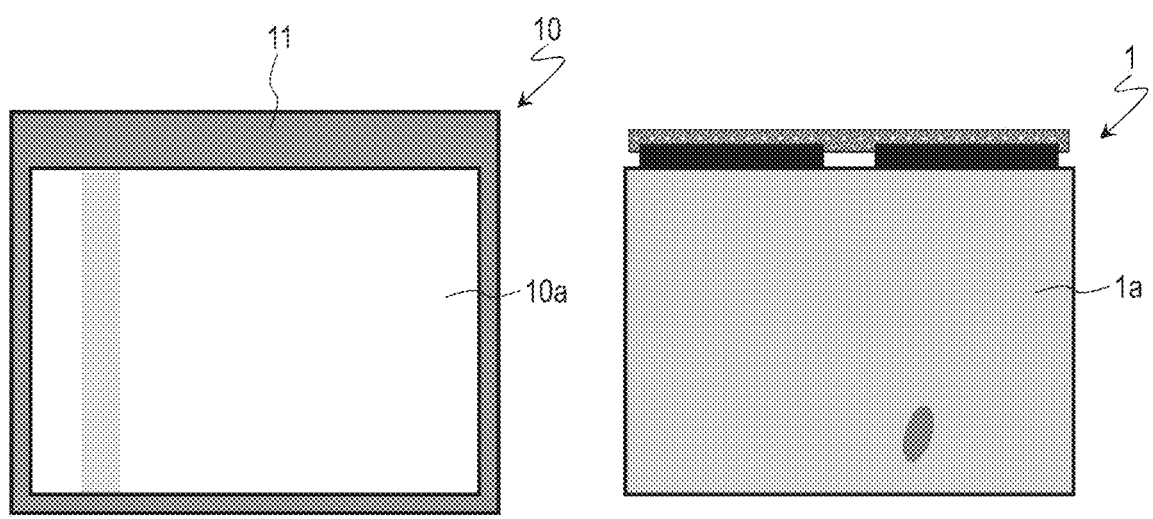
FIG. 2 illustrates, by way of example, luminance unevenness specific to an inspection backlight 10 and luminance unevenness specific to a liquid-crystal display panel 1.

The operation (also referred to as a method of luminance-unevenness correction) of the correction system 100 in this preferred embodiment and an effect of the correction system 100 will be described anew in comparison with a correction system (method of correction) in a comparative example. FIG. 2 illustrates, on the left side, the luminance unevenness specific to the inspection backlight 10, by way of example and illustrates, on the right side, the luminance unevenness specific to the liquid-crystal display panel 1, by way of example. The inspection backlight 10 shown on the left side of FIG. 2 has a housing 11 including a frame part, which is located around an emission surface 10*a*. In the example shown on the left side of FIG. 2, a slightly dark region in strip form extends in the up-and-down direction on the left side of the emission surface 10*a*. In the example shown on the right side of FIG. 2, an elliptic dark region exists on the slightly lower right side of a display surface 1*a* of the liquid-crystal display panel 1. The following describes, as an example, an instance where the inspection backlight 10 and the liquid-crystal display panel 1 have the luminance unevenness shown in FIG. 2.

Figure 3:
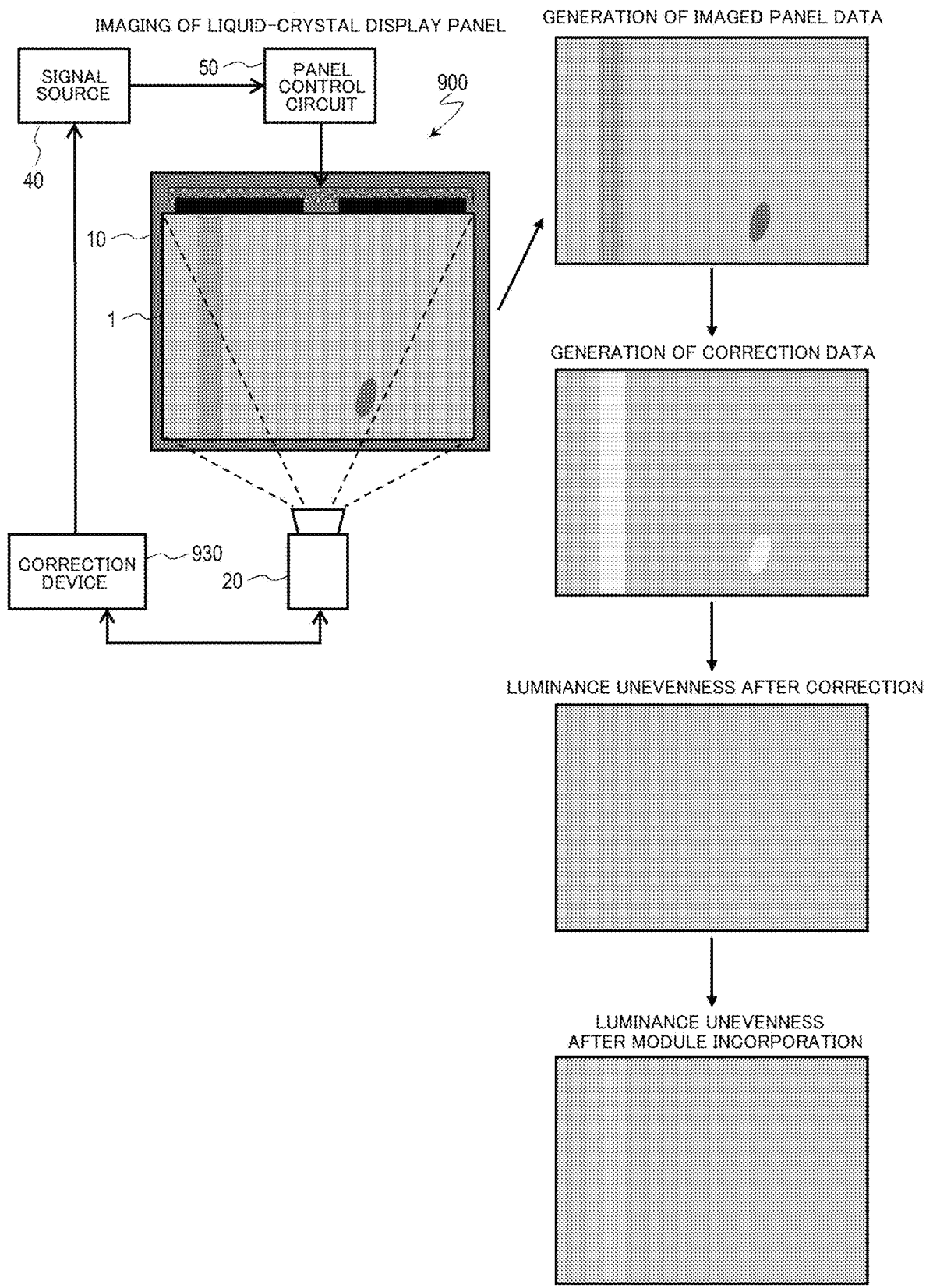
FIG. 3 illustrates how the luminance unevenness of the liquid-crystal display panel 1 is corrected using a correction system 900 in a comparative example.

FIG. 3 illustrates how the luminance unevenness of the liquid-crystal display panel 1 is corrected using a correction system 900 in a comparative example. Like the correction system 100 shown in FIG. 1, the correction system 900 in the comparative example includes the inspection backlight 10, the imaging device 20, a correction device 930, the signal source 40, and the panel control circuit 50. In the correction system 900 in the comparative example however, the imaging device 20 generates imaged panel data, but does not generate backlight luminance-distribution data. The correction device 930 thus does not extract panel luminance-distribution data.

In the correction system 900 in the comparative example, the imaging device 20 firstly images the liquid-crystal display panel 1 being illuminated by the inspection backlight 10, as illustrated on the left side of FIG. 3. This generates imaged panel data, as illustrated at the top on the right side of FIG. 3. The imaged panel data has the luminance unevenness specific to the inspection backlight 10 in addition to luminance unevenness specific to the liquid-crystal display panel 1. The correction device 930 next generates correction data in accordance with the imaged panel data, as illustrated at the second stage from the top on the right side of FIG. 3. Not only the luminance unevenness specific to the liquid-crystal display panel 1, but also the luminance unevenness specific to the inspection backlight 10 is reflected on the correction data. The correction data is then written into the storage device 2 of the liquid-crystal display panel 1, and a correction is thereafter made based on the correction data. The luminance unevenness seems to have been improved in a post-correction display (display under illumination by the inspection backlight 10), as illustrated at the third stage on the right side of FIG. 3. Once the liquid-crystal display panel 1 is actually incorporated in a module however, the luminance unevenness specific to the inspection backlight 10 undergoes an excessive correction, and thus the luminance unevenness seems to have not been improved, as illustrated at the bottom on the right side of FIG. 3, because the module's backlight has luminance unevenness different from that of the inspection backlight 10 or little has luminance unevenness.

Figure 4:
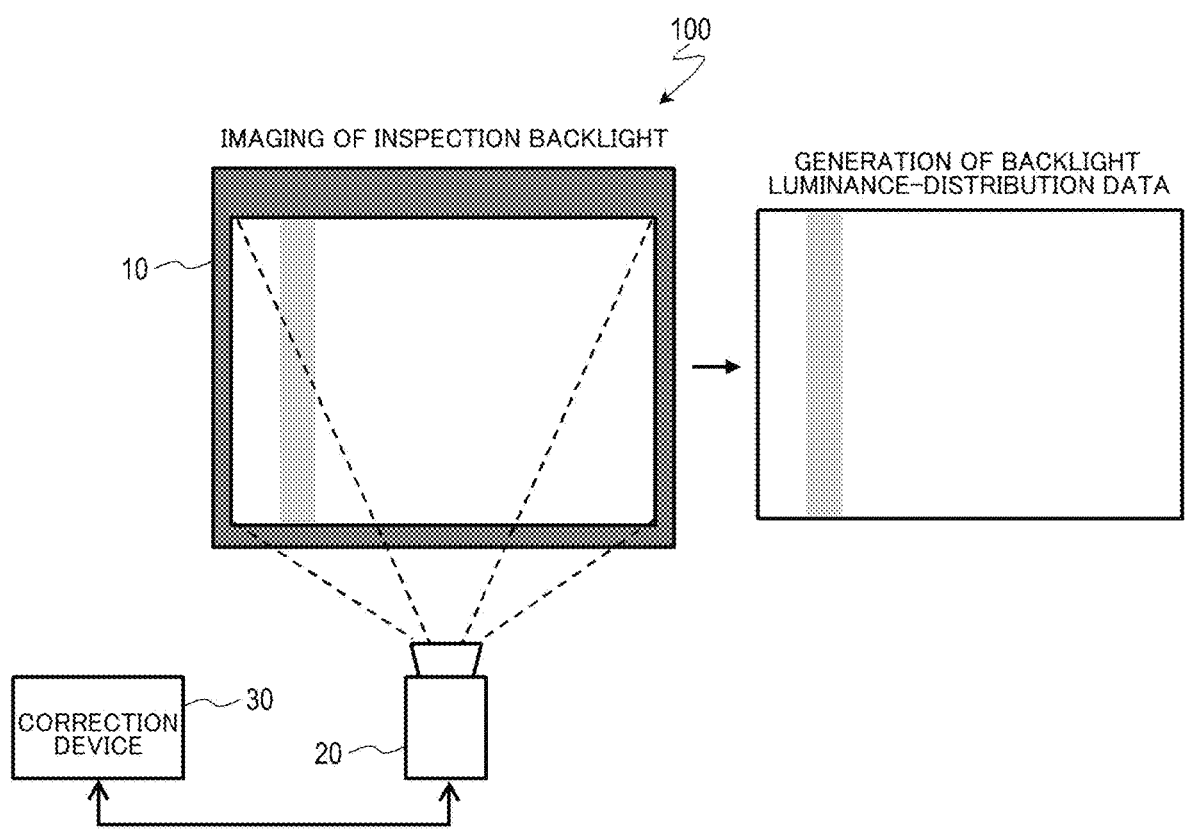
FIG. 4 schematically illustrates how the luminance unevenness of the liquid-crystal display panel 1 is corrected using the luminance-unevenness correction system 100.
Figure 5:
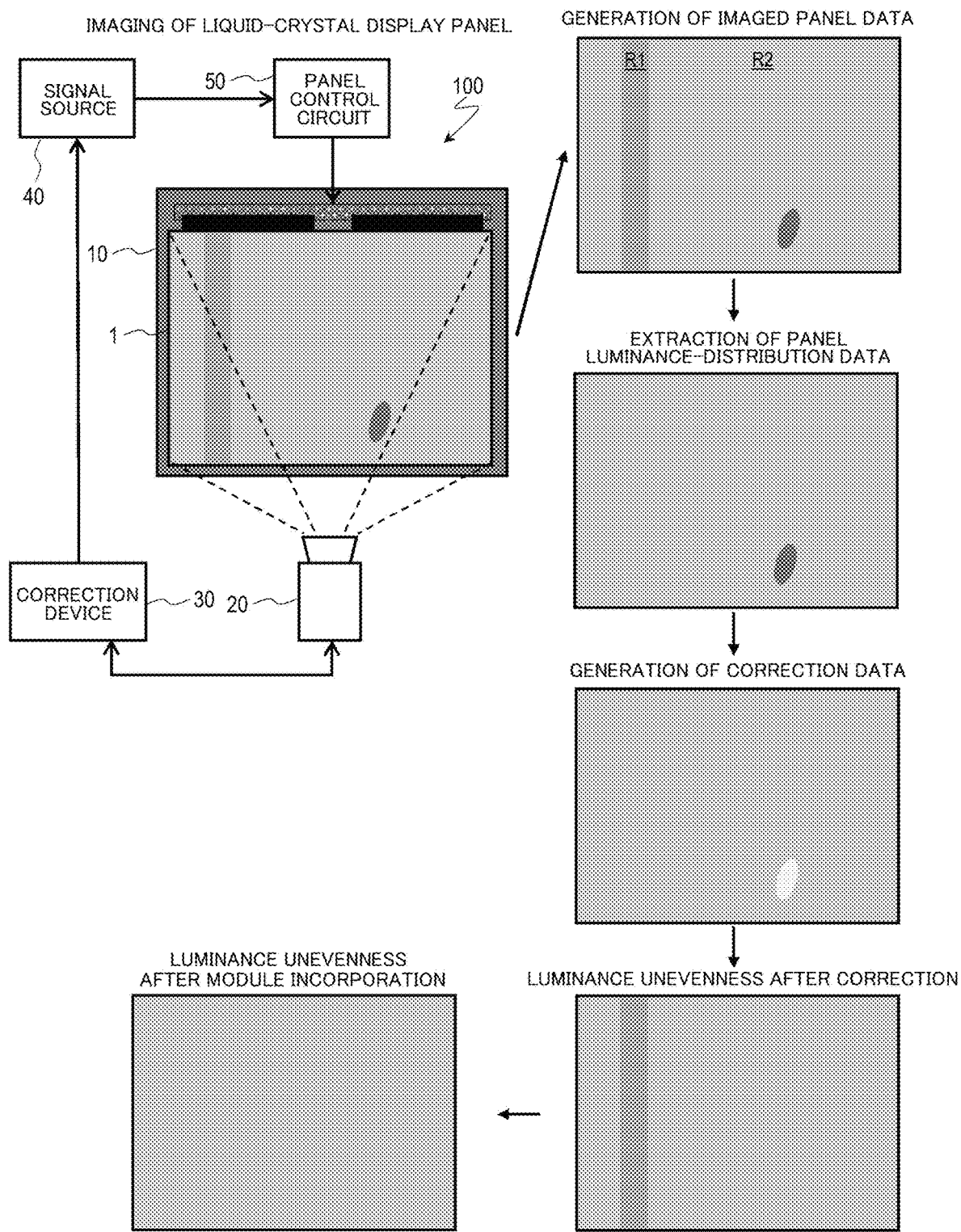
FIG. 5 schematically illustrates how the luminance unevenness of the liquid-crystal display panel 1 is corrected using the luminance-unevenness correction system 100.
Figure 6:
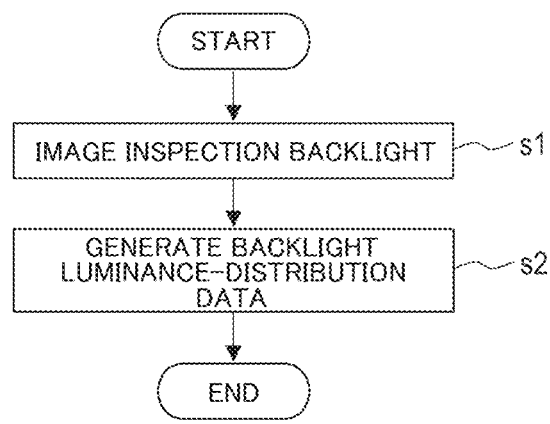
FIG. 6 is a flowchart showing a method of correcting luminance unevenness using the luminance-unevenness correction system 100.
Figure 7:
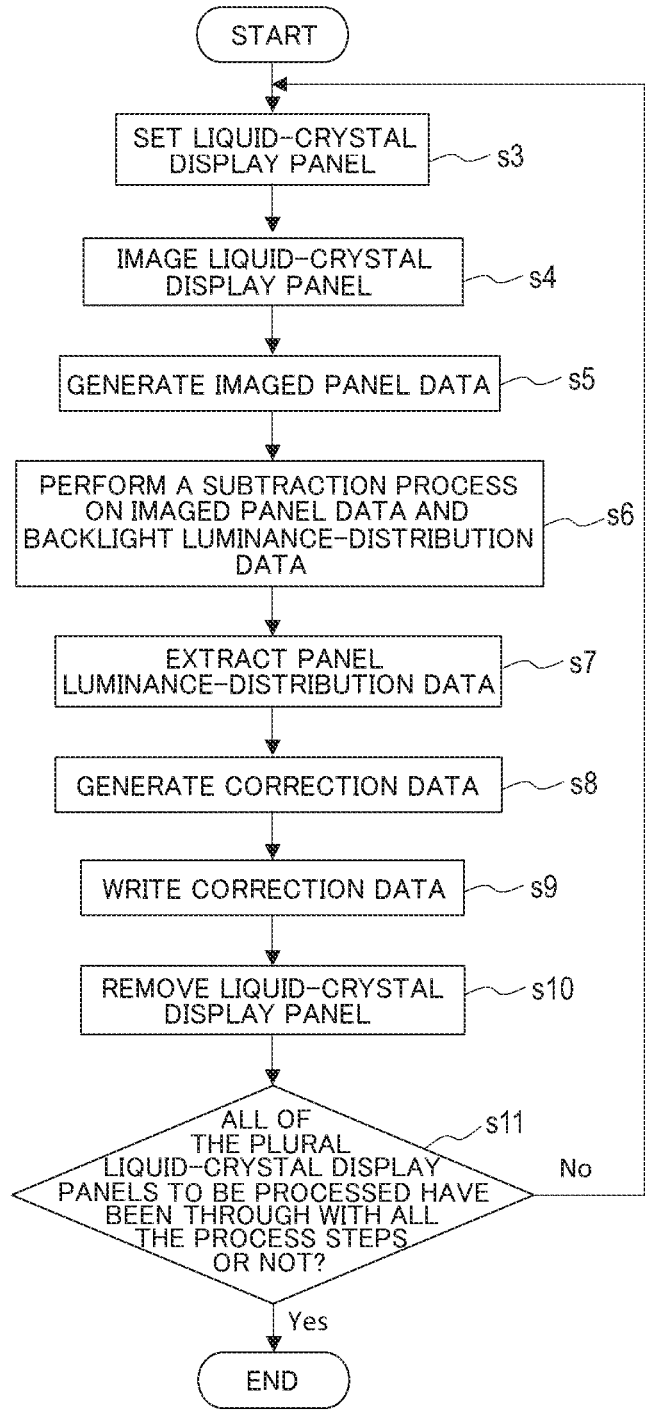
FIG. 7 is a flowchart showing a method of correcting luminance unevenness using the luminance-unevenness correction system 100.

FIG. 4 and FIG. 5 schematically illustrate how the luminance unevenness of the liquid-crystal display panel 1 is corrected using the correction system 100 in this preferred embodiment. FIG. 6 and FIG. 7 are flowcharts each showing a method of correcting luminance unevenness using the correction system 100.

In the correction system 100 in this preferred embodiment, the imaging device 20 firstly images the inspection backlight 10 remaining on (this process step is Step s1), as shown on the left side of FIG. 4, thus generating backlight luminance-distribution data (this process step is Step s2), as illustrated on the right side of FIG. 4. The backlight luminance-distribution data has luminance unevenness specific to the inspection backlight 10. The liquid-crystal display panel 1 is then set in front of the inspection backlight 10 (this process step is Step s3). The imaging device 20 next images the liquid-crystal display panel 1 being illuminated by the inspection backlight 10 (this process step is Step s4), as illustrated at the upper stage on the left side of FIG. 5, thus generating imaged panel data (this process step is Step s5), as illustrated at the top on the right side of FIG. 5. The imaged panel data has the luminance unevenness specific to the inspection backlight 10 in addition to luminance unevenness specific to the liquid-crystal display panel 1.

The correction device 30 next performs a subtraction process on the imaged panel data and backlight luminance-distribution data (this process step is Step s6), as illustrated at the second stage from the top on the right side of FIG. 5, thus extracting panel luminance-distribution data (this process step is Step s7). In the present disclosure, the subtraction process is a process of subtracting the luminance values of the corresponding pixels between the imaged panel data and the backlight luminance-distribution data. Specifically, the luminance unevenness specific to the inspection backlight is removed from the imaged panel data by subtracting the luminance value of the backlight luminance-distribution data from the luminance value of the imaged panel data (a predetermined coefficient may be multiplied by the luminance value when subtracting the luminance value.). The panel luminance-distribution data is obtained by the above process. The panel luminance-distribution data indicates the luminance unevenness specific to the liquid-crystal display panel 1. The correction device 30 next generates correction data in accordance with the panel luminance-distribution data (this process step is Step s8), as illustrated at the third stage from the top on the right side of FIG. 5. Although the luminance unevenness specific to the liquid-crystal display panel 1 is reflected on the correction data, the luminance unevenness specific to the inspection backlight 10 is not reflected on the correction data.

The correction data is then written into the storage device 2 of the liquid-crystal display panel 1 (this process step is Step s9), and thereafter, the liquid-crystal display panel 1 is removed from the front of the inspection backlight 10 (this process step is Step s10). The next is determining whether all of plural the liquid-crystal display panels 1 to be processed have been through with all the process steps (this process step is Step s11). If YES, the luminance-unevenness correction is ended. If NO, the liquid-crystal display panel 1 that is a next target undergoes Steps s3 through s11 again.

The liquid-crystal display panel 1 after reset undergoes a correction based on the correction data. In a post-correction display (display under illumination by the inspection backlight 10), although the luminance unevenness specific to the liquid-crystal display panel 1 has been improved, the luminance unevenness specific to the inspection backlight 10 has not been improved, and hence, the luminance unevenness as a whole seems to have not been improved, as illustrated at the bottom on the right side of FIG. 5. Once the liquid-crystal display panel 1 is actually incorporated in a module however, the luminance unevenness as a whole seems to have been improved, as illustrated at the lower stage on the left side of FIG. 5, because an excessive correction (this results from a correction made to the luminance unevenness specific to the inspection backlight 10) is not made.

The correction system 100 in this preferred embodiment can correct the luminance unevenness of each liquid-crystal display panel 1 without the influence of the luminance unevenness specific to the inspection backlight 10.

The correction device 30 in this preferred embodiment generates the correction data for a region having no luminance unevenness specific to the inspection backlight 10, but the correction device 30 does not generate the correction data for a region having luminance unevenness specific to the inspection backlight 10. To be specific, based on the backlight luminance-distribution data, the correction device 30 identifies (see the top on the right side of FIG. 5), in the imaged panel data, a region R1 having luminance unevenness specific to the inspection backlight 10 (hereinafter, referred to as a "first region"), and a region R2 having no luminance unevenness specific to the inspection backlight 10 (hereinafter, referred to as a "second region"), and the correction device 30 does not generate the correction data for the first region R1 and generates the correction data for the second region R2.

The first region R1 can be identified in the following manner specifically.

For instance, a region that is defined by a boundary line obtained by connecting points of change in luminance value (pixels with the luminance value difference between each of the pixels and its adjacent pixel being equal to or greater than a predetermined value) together, can be identified as the first region R1. Alternatively, a region in which the luminance difference between the luminance value in each position and a reference luminance value, which is the luminance in the middle of the emission surface 10a of the inspection backlight 10, exceeds an established threshold, may be identified as the first region R1. Alternatively, a region in which the luminance difference between the mean value of the luminance of the emission surface 10a and the luminance value in each position exceeds a threshold, may be identified as the first region R1. Alternatively, a region in which the luminance difference between the maximum value of the luminance of the emission surface 10a and the luminance value in each position exceeds a threshold, may be identified as the first region R1; alternatively, a region in which the luminance difference between the mode value of the luminance of the emission surface 10a and the luminance value in each position exceeds a threshold, may be identified as the first region R1.

The timing for imaging the inspection backlight 10 can be selected from, but not limited to, (1) every time, (2) at the time of work start and at the time of model change, (3) at the time of periodic checkups, and (4) at the time of component (such as a light source) replacement. The inspection backlight 10, which can undergo imaging during replacement of the liquid-crystal display panel 1, can undergo imaging without affecting processing time.

Second Preferred Embodiment

Figure 8:
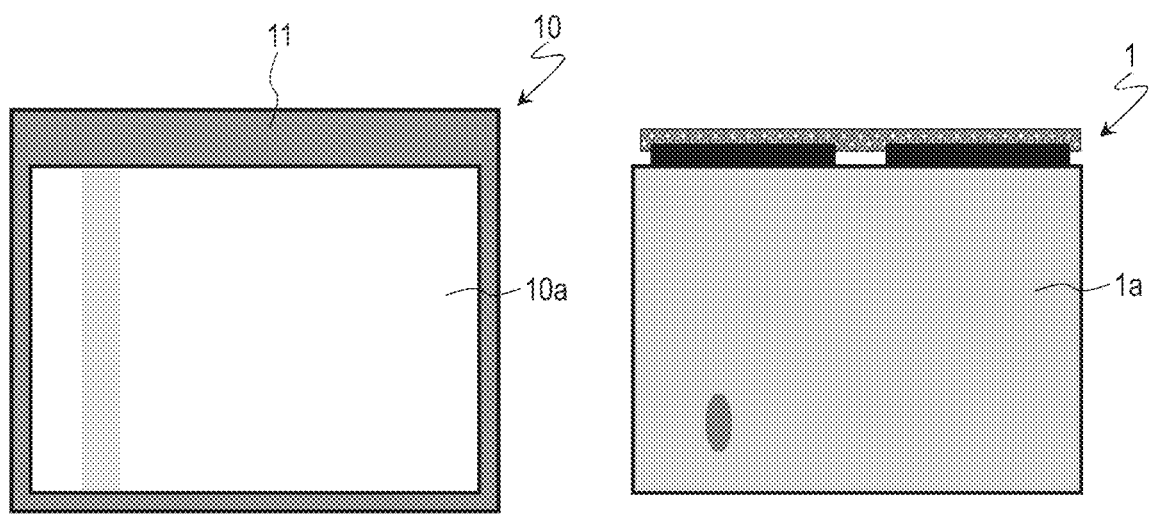
FIG. 8 illustrates, by way of example, luminance unevenness specific to the inspection backlight 10 and luminance unevenness specific to the liquid-crystal display panel 1.

In this preferred embodiment, correction data is generated not only for a region (second region) having no luminance unevenness specific to the inspection backlight 10, but also for a region (first region) having luminance unevenness specific to the inspection backlight 10. This preferred embodiment describes, as an example, an instance where the inspection backlight 10 and the liquid-crystal display panel 1 have the luminance unevenness shown in FIG. 8. In the example shown on the left side of FIG. 8, a slightly dark region in strip form extends in the up-and-down direction on the left side of the emission surface 10a of the inspection backlight 10. In the example shown on the right side of FIG. 8, an elliptic dark region exists on the lower left side of the display surface 1a of the liquid-crystal display panel 1.

FIG. 9A to FIG. 9E schematically illustrate how the luminance unevenness of the liquid-crystal display panel 1 is corrected in an aspect of this preferred embodiment.

Like that in the first embodiment, the imaging device 20 firstly images the inspection backlight 10 remaining on, thus generating backlight luminance-distribution data. The backlight luminance-distribution data has luminance unevenness specific to the inspection backlight 10.

Figure 9A:
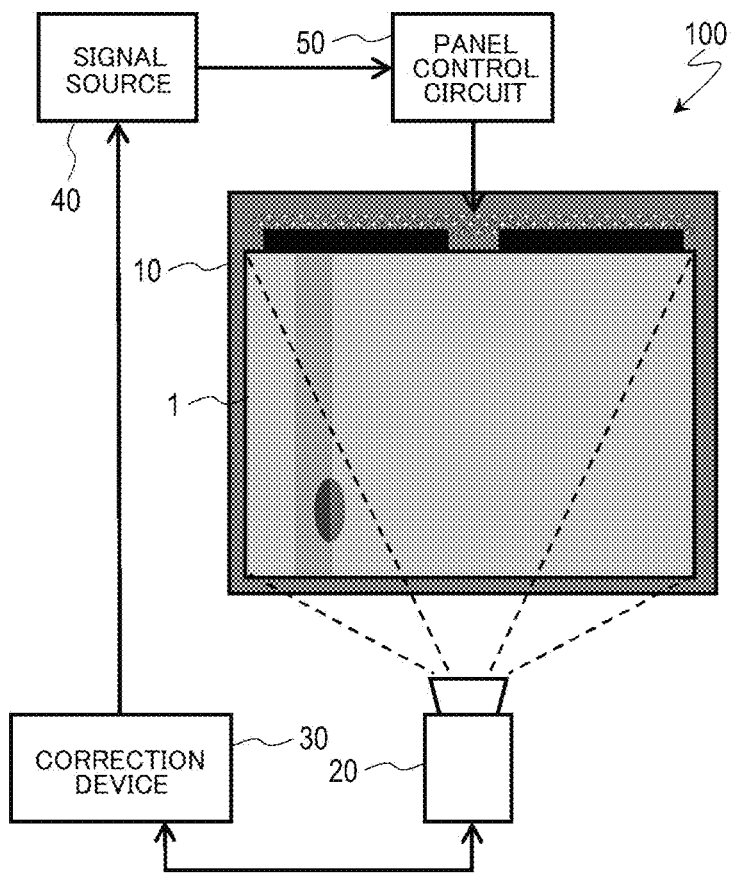
FIG. 9A schematically illustrates how the luminance unevenness of the liquid-crystal display panel 1 is corrected using the luminance-unevenness correction system 100.
Figure 9B:
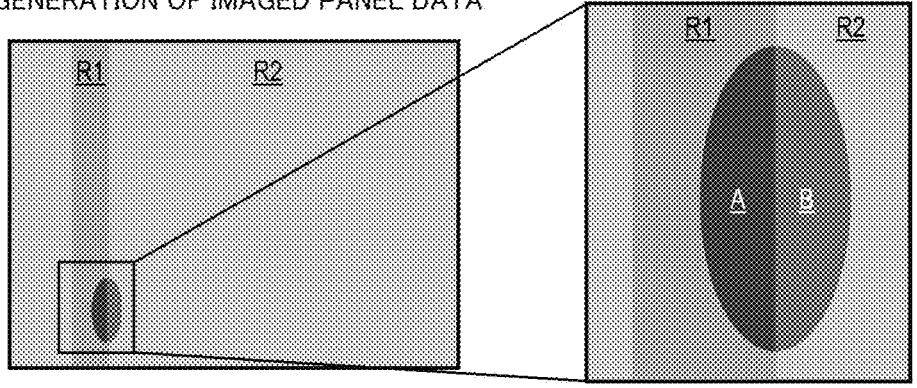
FIG. 9B schematically illustrates how the luminance unevenness of the liquid-crystal display panel 1 is corrected using the luminance-unevenness correction system 100.

The imaging device 20 next images the liquid-crystal display panel 1 being illuminated by the inspection backlight 10, as illustrated in FIG. 9A. This generates imaged panel data, as illustrated in FIG. 9B. The imaged panel data has the luminance unevenness specific to the inspection backlight 10 in addition to luminance unevenness specific to the liquid-crystal display panel 1. Based on the backlight luminance-distribution data, the correction device 30 can identify, in the imaged panel data, the first region R1, which has luminance unevenness specific to the inspection backlight 10, and the second region R2, which has no luminance unevenness specific to the inspection backlight 10. In the example shown in FIG. 9B, a region having luminance unevenness specific to the liquid-crystal display panel 1 includes an overlap portion A overlapping the first region R1, and a non-overlap portion not overlapping the first region R1. The overlap portion A is darker than the non-overlap portion B in the example illustrated herein.

Figure 9C:
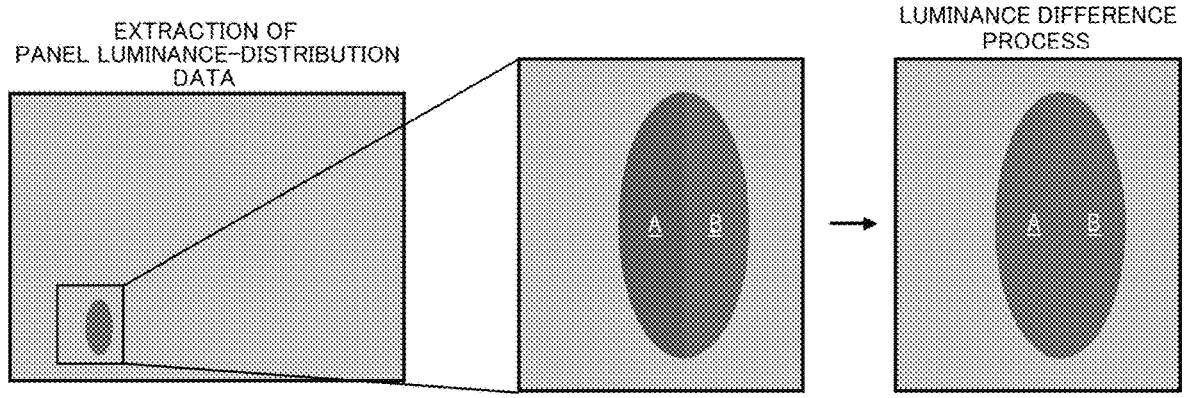
FIG. 9C schematically illustrates how the luminance unevenness of the liquid-crystal display panel 1 is corrected using the luminance-unevenness correction system 100.

The correction device 30 next extracts panel luminance-distribution data from the imaged panel data and backlight luminance-distribution data, as illustrated on the left side of FIG. 9C. The panel luminance-distribution data indicates the luminance unevenness specific to the liquid-crystal display panel 1. To be specific, the panel luminance-distribution data is extracted by performing a predetermined data process including a subtraction process on the imaged panel data and backlight luminance-distribution data.

The surface luminance of the inspection backlight 10 is typically about 10 to 20 times greater than the surface luminance of the liquid-crystal display panel 1; hence, the subtraction process is preferably performed after luminance value interpolation is performed. To be specific, the correction device 30 preferably extracts the panel luminance-distribution data by subtracting, from the imaged panel data, a luminance value of the backlight luminance-distribution data multiplied by a predetermined factor, or by subtracting the backlight luminance-distribution data from a luminance value of the imaged panel data multiplied by a predetermined factor. Each predetermined factor is calculated based, for instance, on the transmittancy of the liquid-crystal display panel 1, and the gradation (gradation of a test image) of the display surface 1a at the time of luminance-unevenness correction.

Since this process uses a predetermined factor, it is conceivable that the luminance at the boundary between the overlap portion A and non-overlap portion B does not match in the panel luminance-distribution data. The correction device 30 herein calculates a luminance difference at the boundary between the overlap portion A and non-overlap portion B and adds, to the luminance value of the overlap portion A, a value corresponding to the luminance difference (this process is hereinafter referred to as a "luminance difference process"), as illustrated on the right side of FIG. 9C. This can reduce the luminance difference between the overlap portion A and non-overlap portion B.

Figure 9D:
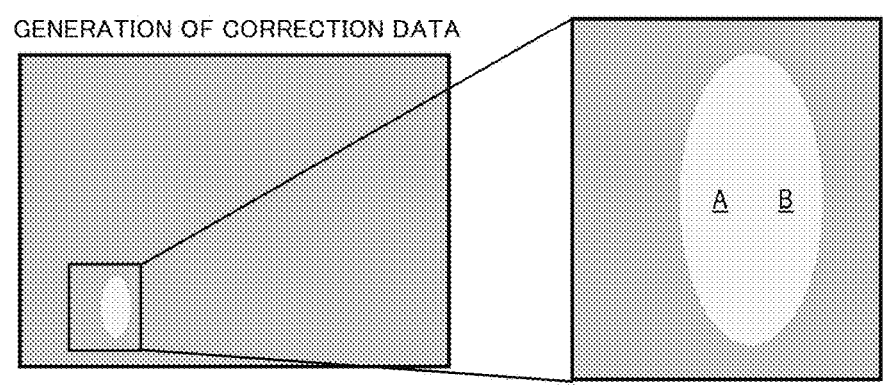
FIG. 9D schematically illustrates how the luminance unevenness of the liquid-crystal display panel 1 is corrected using the luminance-unevenness correction system 100.
Figure 9E:
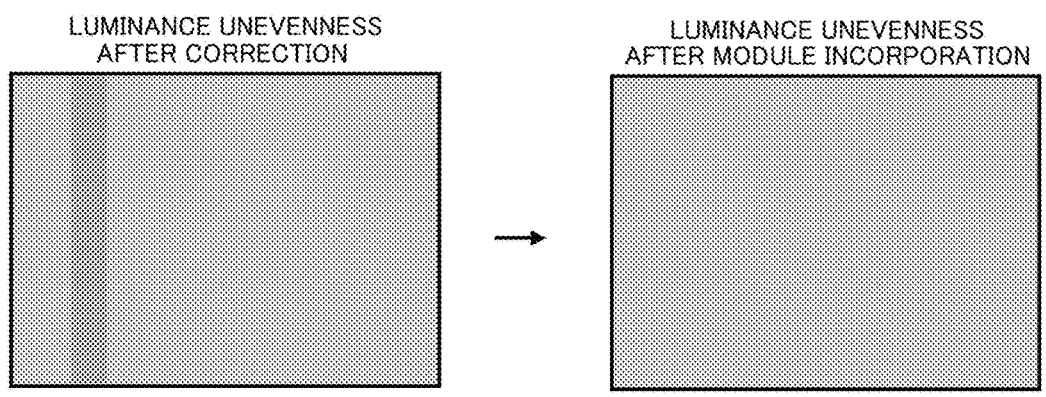
FIG. 9E schematically illustrates how the luminance unevenness of the liquid-crystal display panel 1 is corrected using the luminance-unevenness correction system 100.

The correction device 30 next generates correction data in accordance with the panel luminance-distribution data, as illustrated in FIG. 9D. Although the luminance unevenness specific to the liquid-crystal display panel 1 is reflected on the correction data, the luminance unevenness specific to the inspection backlight 10 is not reflected on the correction data.

The correction data is then written into the storage device 2 of the liquid-crystal display panel 1, and a correction is thereafter made based on the correction data. In a post-correction display, although the luminance unevenness specific to the liquid-crystal display panel 1 has been improved, the luminance unevenness specific to the inspection backlight 10 has not been improved, and hence, the luminance unevenness as a whole seems to have not been improved, as illustrated on the left side of FIG. 9E. Once the liquid-crystal display panel 1 is actually incorporated in a module however, the luminance unevenness as a whole seems to have been improved, as illustrated on the right side of FIG. 9E, because an excessive correction (this results from a correction made to the luminance unevenness specific to the inspection backlight 10) is not made.

This preferred embodiment enables an accurate correction to be made for also a region having luminance unevenness specific to the inspection backlight 10.

Although the foregoing has described an instance where the overlap portion A is darker than the non-overlap portion B, the overlap portion A is brighter than the non-overlap portion B in some cases. In these cases, the luminance difference between the overlap portion A and non-overlap portion B can be reduced by subtracting, from the luminance value of the overlap portion A, a value corresponding to the luminance difference at the boundary between the overlap portion A and non-overlap portion B.

Alternatively, the correction data after generation may undergo a process to reduce the luminance difference between the overlap region A and non-overlap region B, instead of the foregoing luminance difference process in the panel luminance-distribution data. To be specific, the correction device 30 may generate the correction data, followed by calculating a correction value difference at the boundary between the overlap portion A and non-overlap portion B and adding (when the overlap portion A is darker than the non-overlap portion B) or subtracting (when the overlap portion A is brighter than the non-overlap portion B) a value corresponding to the correction value difference to or from a correction value of the overlap portion A.

Instead of luminance value interpolation, the luminance of the backlight luminance-distribution data may be regulated by any of means (1) to (4) listed below.

(1) Use an ND filter when imaging the inspection backlight 10.

(2) Perform imaging while keeping the luminance of the inspection backlight 10 low.

(3) Regulate exposure time in imaging the inspection backlight 10.

(4) Perform imaging with the liquid-crystal display panel 1 having substantially no luminance unevenness placed in front of the inspection backlight 10.

Third Preferred Embodiment

Possible ways of setting the liquid-crystal display panel 1 in front of the inspection 15 backlight 10 include automatic supply by the use of a panel transport facility, and an operator's manual operation. The inspection backlight 10 and the imaging device 20 are fastened at their respective predetermined positions, and hence no positional shift in origin point coordinates occurs in imaging the inspection backlight 10. It is conceivable however that the origin point coordinates possibly shift every time the liquid-crystal display panel 1 undergoes imaging, depending on the operation accuracy of the panel transport facility or the operation accuracy of the operator.

Figure 10:
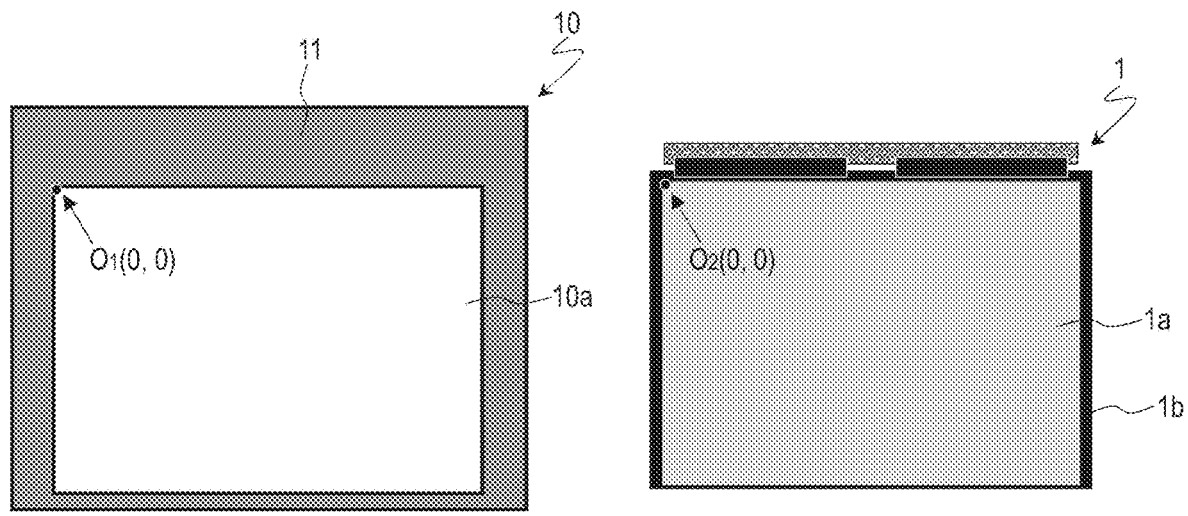
FIG. 10 illustrates the position of an origin point $O_1$ in the inspection backlight 10, and the position of an origin point $O_2$ in the liquid-crystal display panel 1.

FIG. 10 illustrates the position of an origin point $O_1$ in the inspection backlight 10, and the position of an origin point $O_2$ in the liquid-crystal display panel 1. In the example shown on the left side of FIG. 10, the origin point $O_1$ in the inspection backlight 10 is at the upper-left corner of the emission surface 10a. In the example shown on the right side of FIG. 10, the origin point $O_2$ in the liquid-crystal display panel 1 is at the upper-left corner of the display surface 1a defined by a black matrix 1b.

Figure 11:
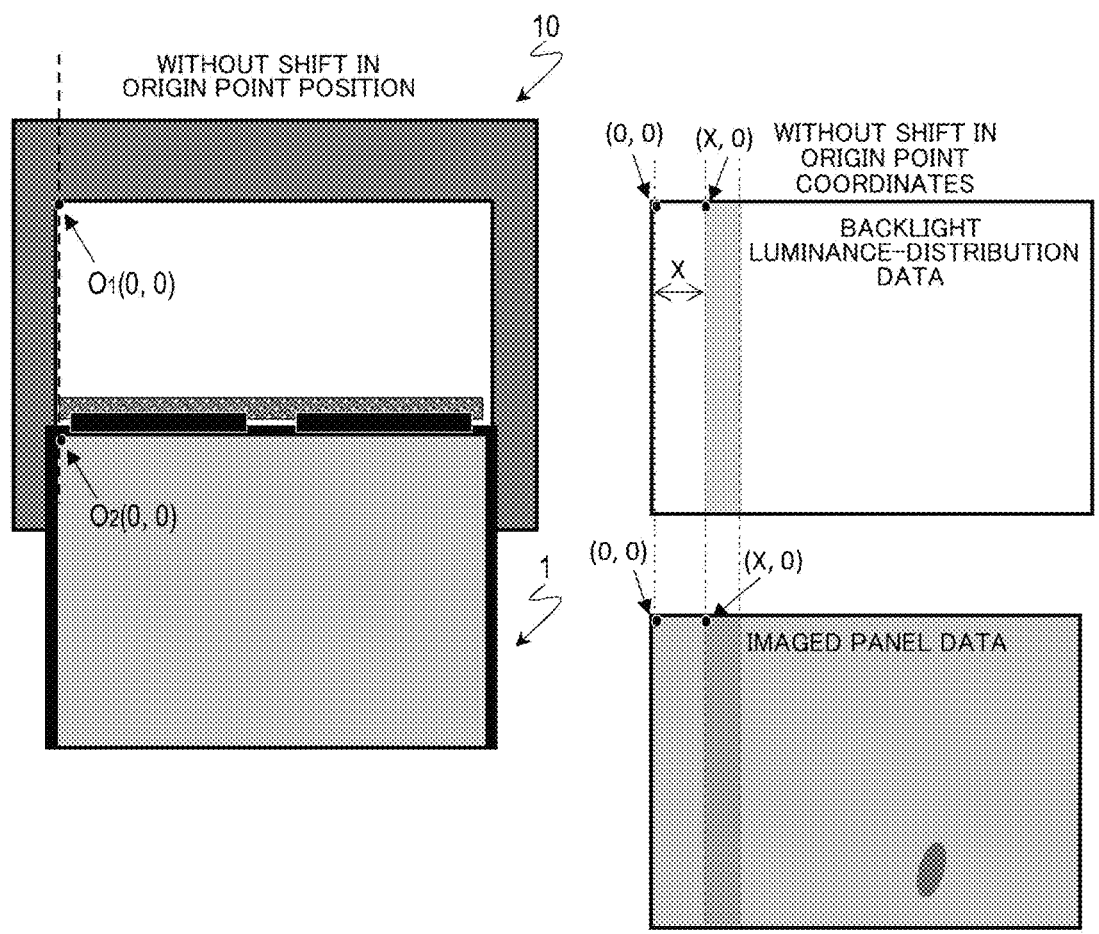
FIG. 11 illustrates an instance where no positional shift is found between the origin point $O_1$ in the inspection backlight 10 and the origin point $O_2$ in the liquid-crystal display panel 1.

No shift occurs between the origin point coordinates of backlight luminance-distribution data and the origin point coordinates of imaged panel data, as illustrated on the right side of FIG. 11, when the liquid-crystal display panel 1 is set without deviation, as illustrated on the left side of FIG. 11, that is, when there is no positional shift between the origin point $O_1$ in the inspection backlight 10 and the origin point $O_2$ in the liquid-crystal display panel 1. These data pieces may hence undergo processing as they are.

Figure 12:
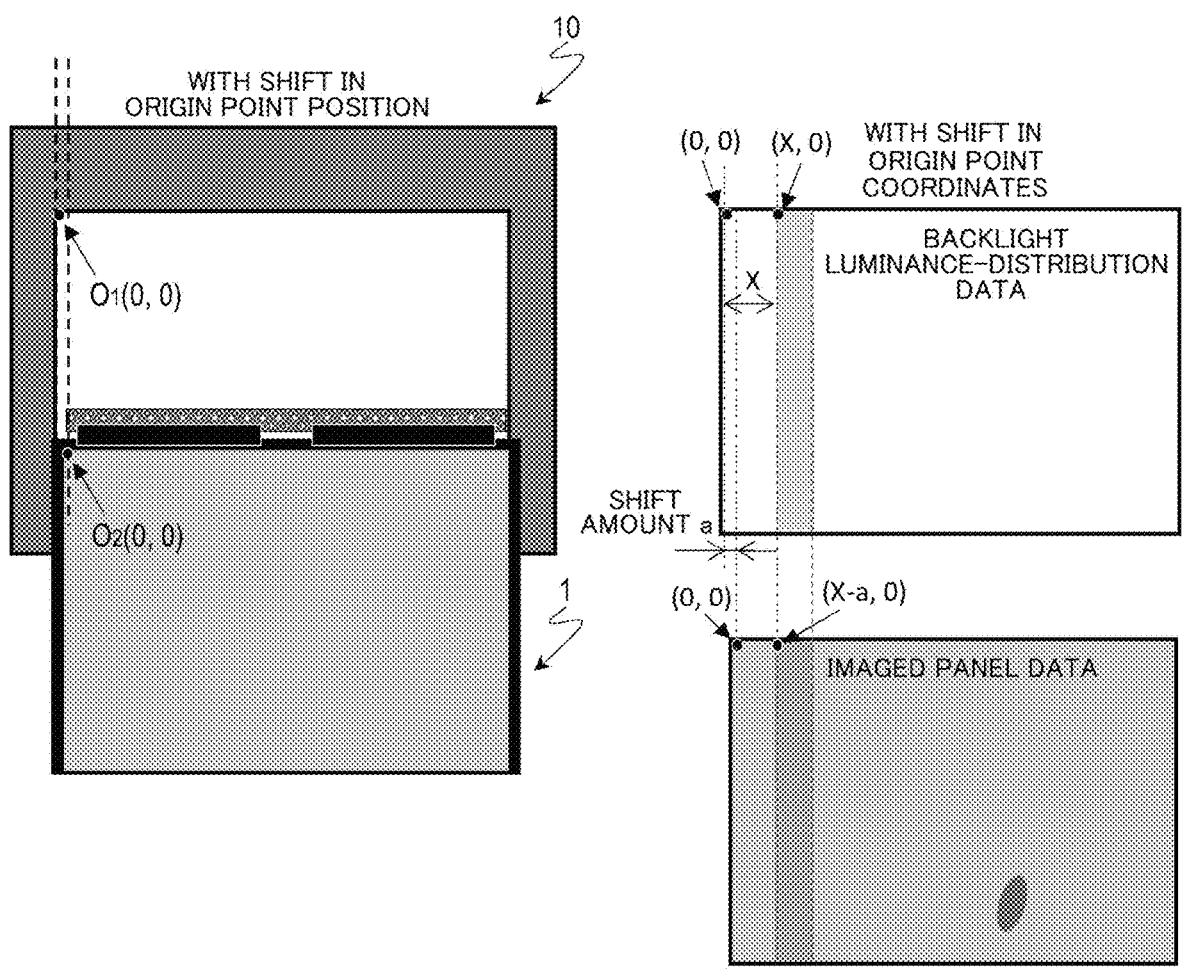
FIG. 12 illustrates an instance where a positional shift is found between the origin point $O_1$ in the inspection backlight 10 and the origin point $O_2$ in the liquid-crystal display panel 1.

In contrast to this, a shift occurs between the origin point coordinates of the backlight luminance-distribution data and the origin point coordinates of the imaged panel data (herein, an instance is provided where a side-to-side shift occurs with a shift amount a), as illustrated on the right side of FIG. 12, when the liquid-crystal display panel 1 is mispositioned, as illustrated on the left side of FIG. 12, that is, when there is a positional shift between the origin point $O_1$ in the inspection backlight 10 and the origin point $O_2$ in the liquid-crystal display panel 1. These data pieces cannot hence undergo processing properly as they are.

The correction device 30 in this preferred embodiment can detect the amount of shift between the origin point coordinates of the backlight luminance-distribution data and the origin point coordinates of the imaged panel data. To be specific, the amount of shift can be detected by any of three aspects listed below.

First Aspect

The correction device 30 in this aspect detects the amount of shift, by identifying a location that is regarded as a location identical between the backlight luminance-distribution data and imaged panel data in accordance with the luminance value and shape of a region having luminance unevenness in the backlight luminance-distribution data, and in accordance with the luminance value and shape of a region having luminance unevenness in the imaged panel data.

The inspection backlight 10 and the imaging device 20 are fastened at their predetermined positions, as earlier described, and thus the position of the origin point coordinates of the backlight luminance-distribution data is the same every time without change. Accordingly, the amount of shift between the origin point coordinates of the backlight luminance-distribution data and the origin point coordinates of the imaged panel data can be detected, by identifying a location that is regarded as a location identical between the backlight luminance-distribution data and imaged panel data in accordance with the luminance value and shape of a region having luminance unevenness in the backlight luminance-distribution data, and in accordance with the luminance value and shape of a region having luminance unevenness in the imaged panel data.

Second Aspect

Figure 13A:
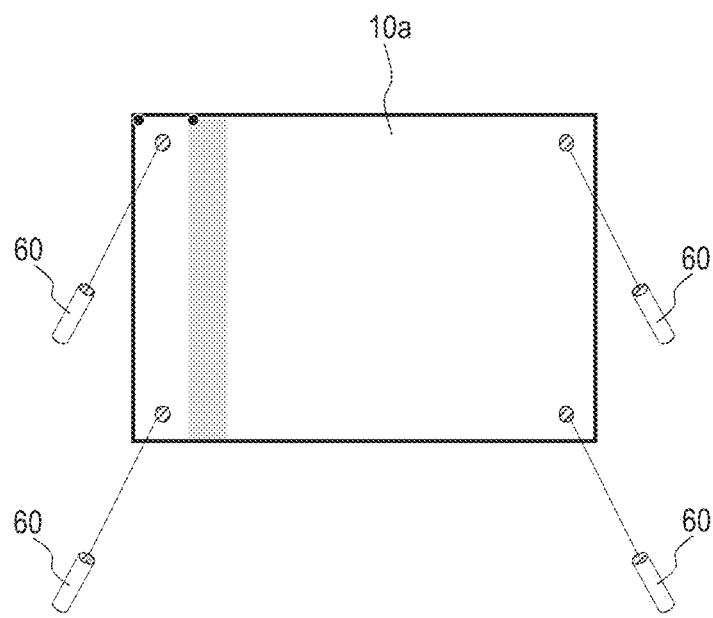
FIG. 13A illustrates an aspect of detecting the amount of shift between the origin point coordinates of backlight luminance-distribution data and the origin point coordinates of imaged panel data.
Figure 13B:
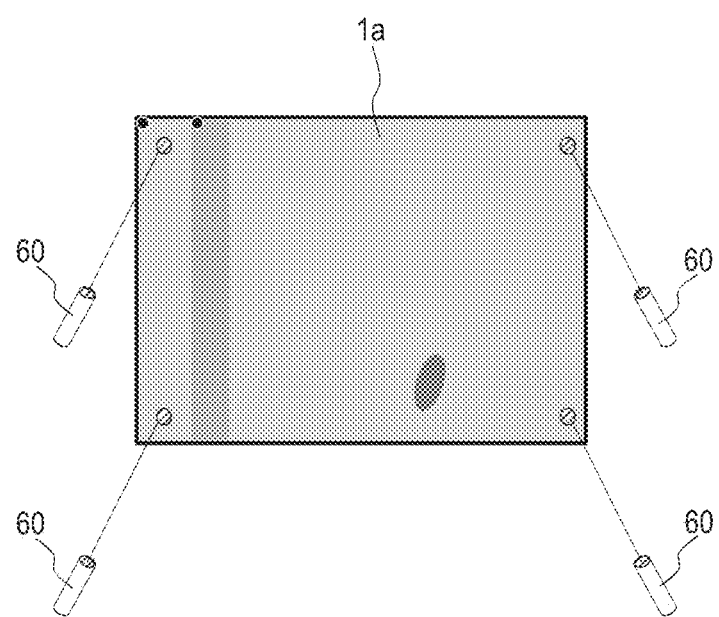
FIG. 13B illustrates an aspect of detecting the amount of shift between the origin point coordinates of the backlight luminance-distribution data and the origin point coordinates of the imaged panel data.

The correction system 100 in this aspect further includes a spot-light radiation device that can radiate at least one spot light. The spot-light radiation device includes four laser pointers 60 for instance, as illustrated in FIG. 13A and FIG. 13B.

In this aspect, the inspection backlight 10 undergoes imaging with a particular part of the emission surface 10a of the inspection backlight 10 irradiated with at least one spot light. To be specific, the imaging is performed with the emission surface 10a, near its four corners, irradiated with spot light, as illustrated in FIG. 13A. The inspection backlight 10 then undergoes imaging with the emission surface 10a not irradiated with spot light.

The liquid-crystal display panel 1 is subsequently set, and thereafter the liquid-crystal display panel 1 undergoes imaging with a particular part of the display surface 1a of the liquid-crystal display panel 1 irradiated with at least one spot light. To be specific, the imaging is performed with the display surface 1a, near its four corners, irradiated with spot light, as illustrated in FIG. 13B. The liquid-crystal display panel 1 then undergoes imaging with the display surface 1a not irradiated with spot light. Herein, the position of the spot-light radiation device and the direction of spot light are the same between the imagining of the inspection backlight 10 under spot light irradiation and the imaging of the liquid-crystal display panel 1 under spot light irradiation.

The correction device 30 thereafter detects the amount of shift between the origin point coordinates of the backlight luminance-distribution data and the origin point coordinates of the imaged panel data, by calculating the amount of coordinate shift between the part irradiated with spot light in the backlight luminance-distribution data and the part irradiated with spot light in the imaged panel data in accordance with the backlight luminance-distribution data generated under spot light irradiation, and in accordance with the imaged panel data generated under spot light irradiation.

Where the emission surface 10a and the display surface 1a undergo spot light irradiation are not limited to the examples shown in FIG. 13A and FIG. 13B. Furthermore, the number of spot lights is not limited to four, which is illustrated in FIG. 13A and FIG. 13B by way of example; three or less spot lights or five or more spot lights may be radiated. A plurality of spot lights do not necessarily have to be radiated; one spot light may be radiated. Here, let the horizontal direction of the display surface of the liquid-crystal display panel 1 be defined as an X-direction, let the vertical direction of the display surface of the liquid-crystal display panel 1 be defined as a Y-direction, and let a rotation direction within the display surface be defined as a θ-direction. For a plurality of spot lights, the amount of shift can be detected for each of the X-direction, Y-direction and θ-direction. No shift occurs in one of the X-direction and Y-direction as well as in the θ-direction when one (extending in the X-direction or Y-direction) of the sides of the liquid-crystal display panel 1 can be fastened by a positioning mechanism or other things; hence, the amount of shift in the remaining direction (the other one of the X-direction and Y-direction) can be detected even when there is one spot light.

Third Aspect

Figure 14A:
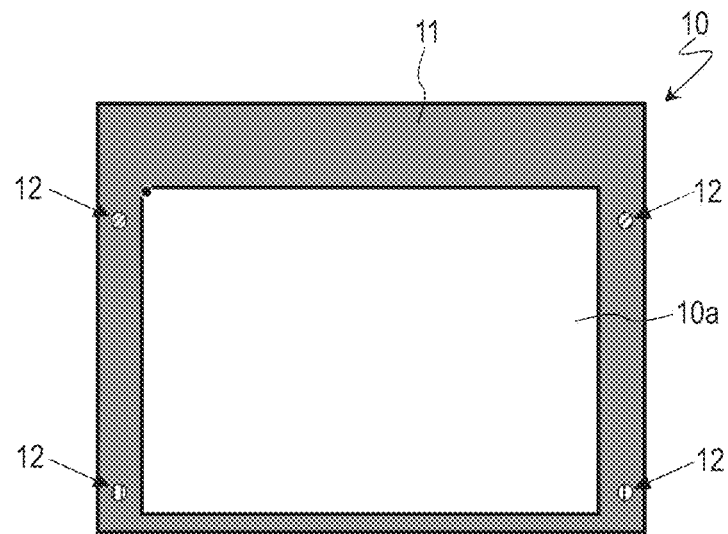
FIG. 14A illustrates an aspect of detecting the amount of shift between the origin point coordinates of the backlight luminance-distribution data and the origin point coordinates of the imaged panel data.
Figure 14B:
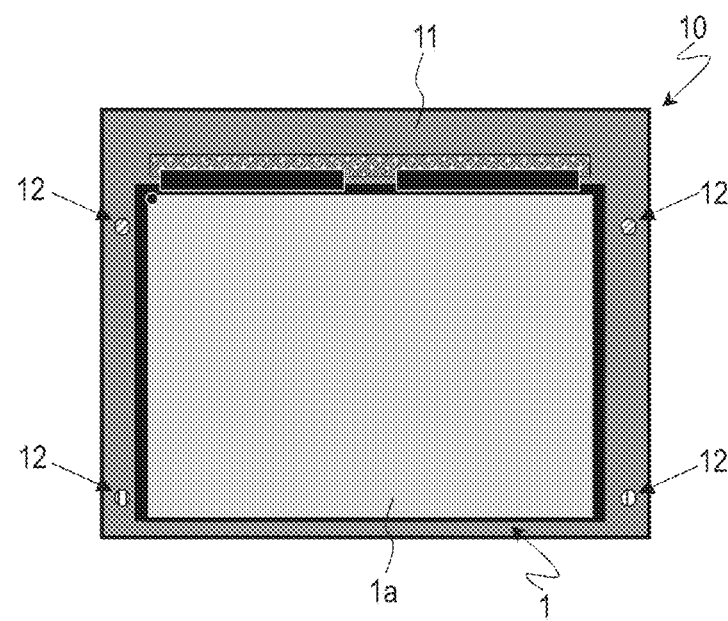
FIG. 14B illustrates an aspect of detecting the amount of shift between the origin point coordinates of the backlight luminance-distribution data and the origin point coordinates of the imaged panel data.

The inspection backlight 10 in this aspect has one or more emission units 12 disposed in the frame part of the housing 11, as illustrated in FIG. 14A and FIG. 14B. The one or more emission units 12 can each emit spot light. In the examples shown in FIG. 14A and FIG. 14B, four emission units 12 arm disposed near the four corners of the emission surface 10a.

In this aspect, the inspection backlight 10 firstly undergoes imaging with the one or more emission units 12 emitting spot light, as illustrated in FIG. 14A. The inspection backlight 10 then undergoes imaging with the one or more emission units 12 not emitting spot light.

The liquid-crystal display panel 1 is subsequently set, and thereafter the liquid-crystal display panel 1 undergoes imaging with the one or more emission units 12 emitting spot light, as illustrated in FIG. 14B. The liquid-crystal display panel 1 then undergoes imaging with the one or more emission units 12 not emitting spot light.

The correction device 30 then detects the amount of shift between the origin point coordinates of the backlight luminance-distribution data and the origin point coordinates of the imaged panel data in accordance with the backlight luminance-distribution data generated with the emission units 12 emitting spot light, and in accordance with the imaged panel data generated with the emission units 12 emitting spot light.

As such, this preferred embodiment enables correction data to be generated by reflecting a shift between the origin point coordinates of the backlight luminance-distribution data and the origin point coordinates of the imaged panel data, even if the liquid-crystal display panel 1 is mispositioned. For instance, a subtraction process between the imaged panel data and backlight luminance-distribution data can be performed with the position of the origin point $O_1$ in the inspection backlight 10 and the position of the origin point $O_2$ in the liquid-crystal display panel 1 coinciding. This can prevent quality degradation in luminance-unevenness correction resulting from mispositioning of the liquid-crystal display panel 1.

Like the number of spot lights, the number of emission units 12 is not limit to four illustrated in FIG. 14A and FIG. 14B by ways of example; three or less emission units 12 or five or more emission units 12 may be provided. A plurality of emission units 12 do not necessarily have to be provided; one emission unit 12 may be provided.

Fourth Preferred Embodiment

A method of luminance-unevenness correction in this preferred embodiment will be described. In the method of luminance-unevenness correction in this preferred embodiment, the correction system 100 can undergo maintenance using backlight luminance-distribution data, as described later on. That is, the method of luminance-unevenness correction in this preferred embodiment can be regarded as a method of performing maintenance on the correction system 100.

Figure 15:
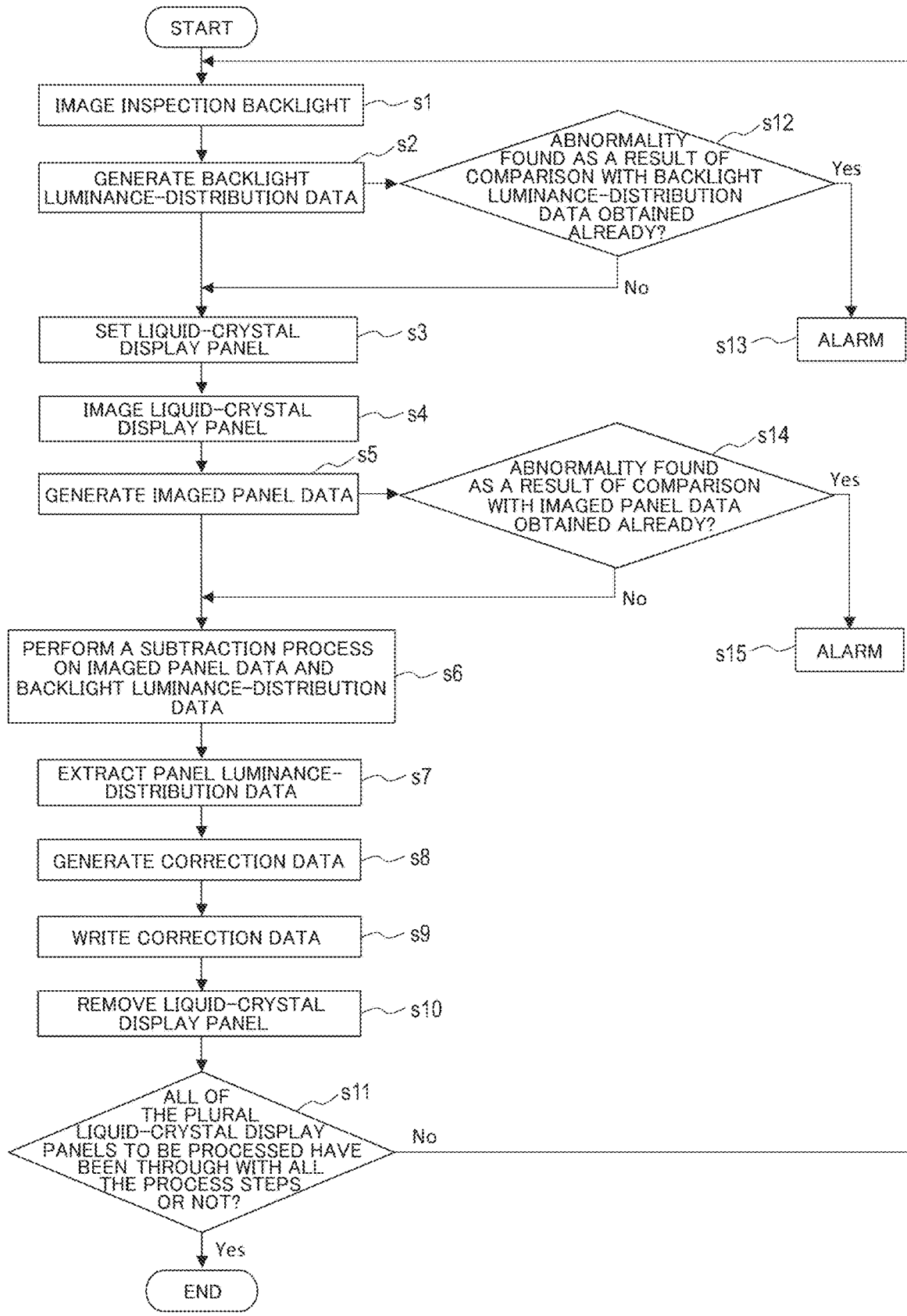
FIG. 15 is a flowchart showing a method of correcting luminance unevenness using the luminance-unevenness correction system 100.

FIG. 15 is a flowchart showing the method of luminance-unevenness correction in this preferred embodiment.

The inspection backlight 10 remaining on firstly undergoes imaging (this process step is Step s1), thus generating backlight luminance-distribution data (this process step is Step s2). The liquid-crystal display panel 1 is then set in front of the inspection backlight 10 (this process step is Step s3). The liquid-crystal display panel 1 being illuminated by the inspection backlight 10 undergoes imaging (this process step is Step s4), thus generating imaged panel data (this process step is Step s5).

The next is performing a subtraction process between the imaged panel data and backlight luminance-distribution data (this process step is Step s6), thus extracting panel luminance-distribution data (this process step is Step s7). The next is generating correction data in accordance with the panel luminance-distribution data (this process step is Step s8), followed by transmitting the correction data to the liquid-crystal display panel 1 to write the correction data into the storage device 2 (this process step is Step s9).

The liquid-crystal display panel 1 is then removed from the front of the inspection backlight 10 (this process step is Step s10). The next is determining whether the liquid-crystal display panel 1 has been through with all the process steps (this process step is Step s11). If YES, the luminance-unevenness correction is ended. If NO, the liquid-crystal display panel 1 that is a next target undergoes Steps s1 through s11 again.

A process step (Steps s1 and s2) in which the imaging device 20 images the inspection backlight 10 to generate backlight luminance-distribution data is thus executed a plurality of times. After Steps s1 and s2 for the second and subsequent times are executed, the next is comparing (this process step is Step s12), for an abnormality, the backlight luminance-distribution data generated anew and the backlight luminance-distribution data generated last time or before (that is, the backlight luminance-distribution data obtained already). If no abnormality is found, the process proceeds to the next step (Step s3). If an abnormality is found, an alarm is issued (this process step is Step s13).

A process step (Steps s4 and s5) in which the imaging device 20 images the liquid-crystal display panel 1 to generate imaged panel data is executed a plurality of times as well. After Steps s4 and s5 for the second and subsequent times are executed, the next is comparing (this process step is Step s14), for an abnormality, the imaged panel data generated anew and the imaged panel data generated last time or before (that is, the imaged panel data obtained already). If no abnormality is found, the process proceeds to the next step (Step s6). If an abnormality is found, an alarm is issued (this process step is Step s15).

Figure 16:
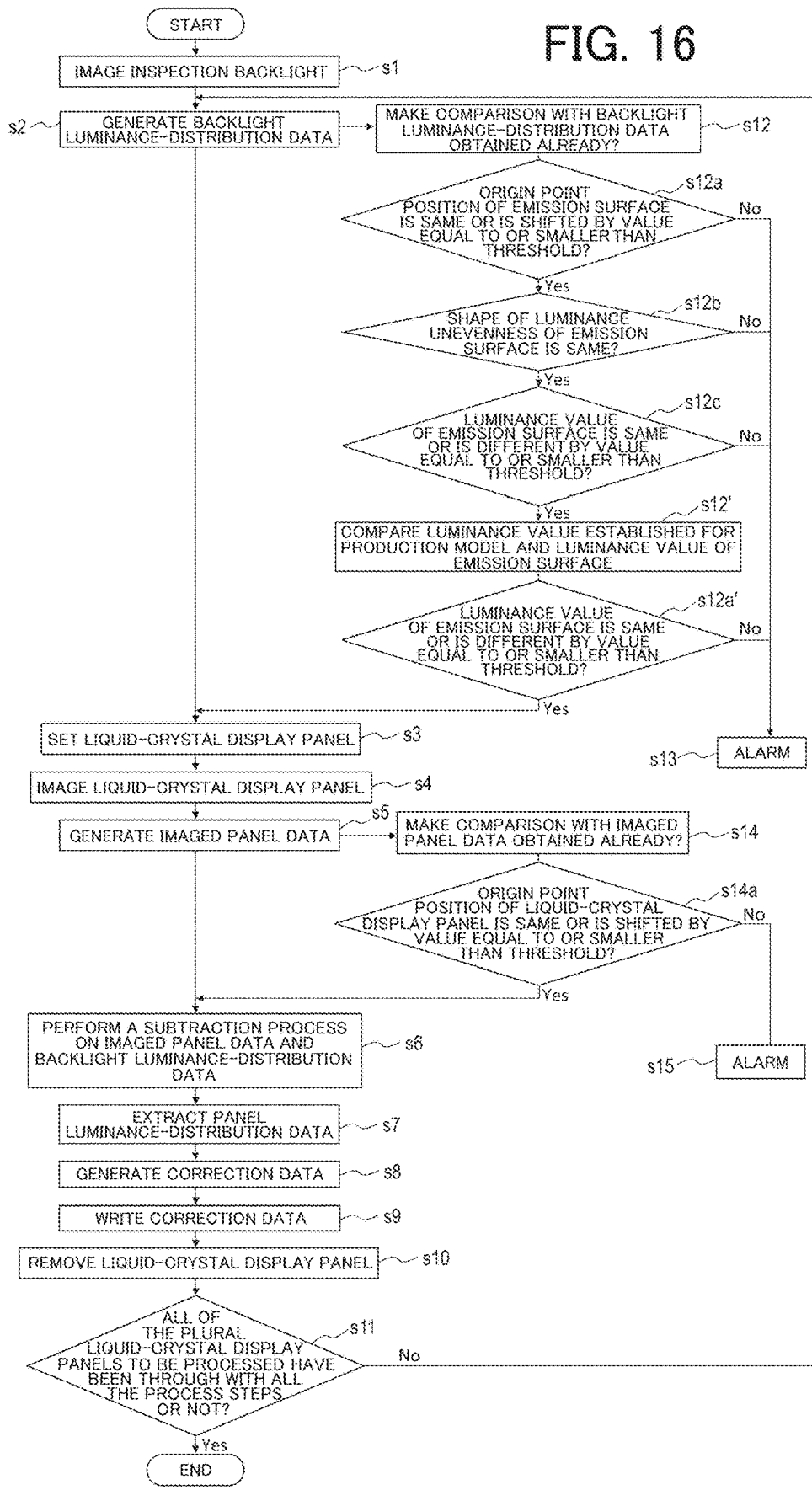
FIG. 16 is a flowchart showing a method of correcting luminance unevenness using the luminance-unevenness correction system 100.

FIG. 16 is a more detailed flowchart showing the method of luminance-unevenness correction in this preferred embodiment.

In the example shown in FIG. 16, in the step (Step s12) of comparing the backlight luminance-distribution data generated anew and the backlight luminance-distribution data obtained already, the first process step (Step s12a) is determining whether the origin point position of the emission surface 10a is the same between both data pieces or is shifted between both data pieces by a value equal to or smaller than a predetermined threshold. If the amount of positional shift in the origin point of the emission surface 10a exceeds the threshold (if an abnormality is found), an alarm is issued (this process step is Step s13).

If the origin point position of the emission surface 10a is the same, or the amount of positional shift is equal to or smaller than the threshold (if no abnormality is found), the next is determining whether the shape of the luminance unevenness of the emission surface 10a is the same between both data pieces (this process step is Step s12b). If the shape of the luminance unevenness is different (if an abnormality is found), an alarm is issued (this process step is Step s13).

If the shape of the luminance unevenness is the same (if no abnormality is found), the next is determining whether the luminance value of the emission surface 10a is the same between both data pieces or is different between both data pieces by a value equal to or smaller than a predetermined threshold (this process step is Step s12c). If the amount of difference in the luminance value of the emission surface 10a exceeds the threshold (if an abnormality is found), an alarm is issued (this process step is Step s13).

If the luminance value of the emission surface 10a is the same or the amount of difference is equal to or smaller than the threshold (if no abnormality is found), the next is comparing the luminance value of the emission surface 10a in the backlight luminance-distribution data generated anew and a luminance value established in advance for a production model (this process step is Step s12'). To be specific, Step s12a' is determining whether the luminance value established for the production model and the luminance value of the emission surface 10a are the same or are different by a value equal to or smaller a predetermined threshold. If the amount of difference between the luminance value established for the production model and the luminance value of the emission surface 10a exceeds the threshold (if an abnormality is found), an alarm is issued (this process step is Step s13). If the luminance value established for the production model and the luminance value of the emission surface 10a are the same or are different by a value equal to or smaller than the threshold (if no abnormality is found), the process proceeds to the next step (Step s3).

The "luminance value of the emission surface 10a" in Step s12c and Step s12' may be, for instance, the luminance value in the middle of the emission surface 10a, or the mean value of the luminance of the emission surface 10a. Alternatively, the "luminance value of the emission surface 10a" may be the maximum value of the luminance of the emission surface 10a, or the mode value of the luminance of the emission surface 10a.

In the example shown in FIG. 16, the step (Step s14) of comparing the imaged panel data generated anew and the imaged panel data obtained already includes, specifically, determining whether the origin point position of the liquid-crystal display panel 1 is the same between both data pieces or is shifted between both data pieces by a value equal to or smaller than a predetermined threshold (this process step is Step s14a). If the amount of positional shift in the origin point of the liquid-crystal display panel 1 exceeds the threshold (if an abnormality is found), an alarm is issued (this process step is Step s15). If the origin point position of the liquid-crystal display panel 1 is the same, or the amount of positional shift is equal to or smaller than the threshold (if no abnormality is found), the process proceeds to the next step (Step s6).

The foregoing method of correction enables such maintenance as listed in (1) to (5) for instance.

(1) The inspection backlight 10 and the imaging device 20 are in their fixed positions; hence, the position of the origin point of the emission surface 10a and the position of a reference point of the emission surface 10a do not change. Consequently, a change in luminance value at these points enables early detection of a facility backlash and other things. This maintenance can be implemented by, for instance, the foregoing determination in Step s12a.

(2) The repetition accuracy of a mechanism for setting the liquid-crystal display panel 1 and the amount of shift can be monitored. This maintenance can be implemented by, for instance, the foregoing determination in Step s14a.

(3) A change in the shape of the luminance unevenness of the emission surface 10a of the inspection backlight 10 or a change in the luminance value of the emission surface 10a enables monitoring of changes in the light volume of the light source. This maintenance can be implemented by, for instance, the foregoing determinations in Steps s12b and s12c.

(4) Physical dirt, a physical flaw and other things on the surface of the inspection backlight 10 can be detected. This maintenance can be implemented by, for instance, the foregoing determinations in Steps s12b and s12c.

(5) A failure of a necessary change in the luminance value of the inspection backlight 10 and other things can be prevented. Such a change is necessary as a result of a model change or other things. This maintenance can be implemented by, for instance, the foregoing determination in Step s12a'.

As described above, the method of luminance-unevenness correction in this preferred embodiment enables an abnormality in the inspection backlight 10 to be detected early.

The preferred embodiments of the present invention can provide a luminance-unevenness correction system and a method of luminance-unevenness correction that can suitably correct luminance unevenness in a liquid-crystal display panel that is distributed as an open cell. The luminance-unevenness correction system and the method of luminance-unevenness correction according to the preferred embodiments of the present invention can be widely used for luminance-unevenness correction in various liquid-crystal display panels.

While there have been described what are at present considered to be certain embodiments of the application, it will be understood that various modifications may be made thereto, and it is intended that the appended claim cover all such modifications as fall within the true spirit and scope of the application.

What is claimed is:

1. A luminance-unevenness correction system that corrects luminance unevenness of a liquid-crystal display panel, the luminance-unevenness correction system comprising:
    an inspection backlight;
    an imaging device configured to generate imaged panel data by imaging the liquid-crystal display panel being illuminated by the inspection backlight; and
    a correction device configured to generate correction data and then transmit the correction data to the liquid-crystal display panel, the correction data being used for correcting the luminance unevenness of the liquid-crystal display panel,
    wherein the imaging device is capable of generating backlight luminance-distribution data indicating a luminance distribution of the inspection backlight, by imaging the inspection backlight remaining on,
    the correction device extracts panel luminance-distribution data from the imaged panel data and the backlight luminance-distribution data, and generates the correction data in accordance with the panel luminance-distribution data extracted, the panel luminance-distribution data indicating luminance unevenness specific to the liquid-crystal display panel, and
    the correction device extracts the panel luminance-distribution data by subtracting, from the imaged panel data, a luminance value of the backlight luminance-distribution data multiplied by a predetermined factor, or by subtracting the backlight luminance-distribution data from a luminance value of the imaged panel data multiplied by a predetermined factor.

2. The luminance-unevenness correction system according to claim 1, wherein
    the correction device identifies a first region and a second region in the imaged panel data in accordance with the backlight luminance-distribution data, and the correction device does not generate the correction data for the first region and generates the correction data for the second region, the first region having luminance unevenness specific to the inspection backlight, the second region having no luminance unevenness specific to the inspection backlight.

3. The luminance-unevenness correction system according to claim 1, wherein
    the correction device identifies a first region and a second region in the imaged panel data in accordance with the backlight luminance-distribution data, the first region having luminance unevenness specific to the inspection backlight, the second region having no luminance unevenness specific to the inspection backlight, a region of the panel luminance-distribution data having luminance unevenness specific to the liquid-crystal display panel includes an overlap portion overlapping the first region, and a non-overlap portion not overlapping the first region, and the correction device calculates a luminance difference at a boundary between the overlap portion and the non-overlap portion, and adds or subtracts a value corresponding to the luminance difference to or from a luminance value of the overlap portion, followed by generating the correction data.

4. The luminance-unevenness correction system according to claim 1, wherein the correction device identifies a first region and a second region in the imaged panel data in accordance with the backlight luminance-distribution data, the first region having luminance unevenness specific to the inspection backlight, the second region having no luminance unevenness specific to the inspection backlight, a region of the panel luminance-distribution data having luminance unevenness specific to the liquid-crystal display panel includes an overlap portion overlapping the first region, and a non-overlap portion not overlapping the first region, and the correction device generates the correction data, followed by calculating a correction value difference at a boundary between the overlap portion and the non-overlap portion, and adding or subtracting a value corresponding to the correction value difference to or from a correction value of the overlap portion.

5. The luminance-unevenness correction system according to claim 1, wherein the correction device is capable of detecting an amount of shift between origin point coordinates of the backlight luminance-distribution data and origin point coordinates of the imaged panel data.

6. The luminance-unevenness correction system according to claim 5, wherein the correction device detects the amount of shift, by identifying a location that is regarded as a location identical between the backlight luminance-distribution data and the imaged panel data in accordance with a luminance value and a shape of a region having luminance unevenness in the backlight luminance-distribution data, and in accordance with a luminance value and a shape of a region having luminance unevenness in the imaged panel data.

7. The luminance-unevenness correction system according to claim 5, further comprising a spot-light radiation device capable of radiating at least one spot light, wherein the correction device detects the amount of shift in accordance with the backlight luminance-distribution data generated with a particular part of an emission surface of the inspection backlight irradiated with the at least one spot light, and in accordance with the imaged panel data generated with a particular part of a display surface of the liquid-crystal display panel irradiated with the at least one spot light.

8. The luminance-unevenness correction system according to claim 5, wherein the inspection backlight has a housing including a frame part located around an emission surface, and one or more emission units disposed in the frame part of the housing, and each being capable of emitting spot light, and the correction device detects the amount of shift in accordance with the backlight luminance-distribution data generated with the one or more emission units emitting spot light, and in accordance with the imaged panel data generated with the one or more emission units emitting spot light.

9. A method of luminance-unevenness correction for correcting luminance unevenness of a liquid-crystal display panel, the method comprising:

step (A) of generating backlight luminance-distribution data indicating a luminance distribution of an inspection backlight, by imaging the inspection backlight remaining on;

step (B) of generating imaged panel data by imaging the liquid-crystal display panel being illuminated by the inspection backlight;

step (C) of extracting panel luminance-distribution data indicating luminance unevenness specific to the liquid-crystal display panel, from the imaged panel data and the backlight luminance-distribution data; and step (D) of generating correction data in accordance with the panel luminance-distribution data and then transmitting the correction data to the liquid-crystal display panel, the correction data being used for correcting the luminance unevenness of the liquid-crystal display panel, wherein the panel luminance-distribution data is calculated by subtracting a luminance value of the backlight luminance-distribution data multiplied by a predetermined factor from the imaged panel data, or by subtracting the backlight luminance-distribution data from a luminance value of the imaged panel data multiplied by a predetermined factor.

10. The method of luminance-unevenness correction according to claim 9, wherein a set of steps (A), (B), (C) and (D) is executed for each of liquid-crystal display panels that are targets of correction, and the method further comprises step (E) of, after step (A) for second and subsequent times is executed, comparing the backlight luminance-distribution data generated anew and the backlight luminance-distribution data generated last time or before.

11. The method of luminance-unevenness correction according to claim 9, wherein a set of steps (A), (B), (C) and (D) is executed for each of liquid-crystal display panels that are targets of correction, and the method further comprises step (F) of, after step (B) for second and subsequent times is executed, comparing the imaged panel data generated anew and the imaged panel data generated last time or before.

12. The method of luminance-unevenness correction according to claim 9, further comprising step (G) of, after step (A) is executed, comparing a luminance value of an emission surface in the backlight luminance-distribution data generated and a luminance value established in advance for a production model.

* * * * *